(12) United States Patent
Strahle et al.

(10) Patent No.: US 10,632,367 B2
(45) Date of Patent: Apr. 28, 2020

(54) SMART TRIGGER-STOPS FOR VIDEOGAME CONTROLLERS

(71) Applicant: Performance Designed Products LLC, San Diego, CA (US)

(72) Inventors: Brad Strahle, Crestline, CA (US); Yannik Wiggemans, Studio City, CA (US)

(73) Assignee: Performance Designed Products LLC, San Diego, CA (US)

( * ) Notice: Subject to any disclaimer, the term of this patent is extended or adjusted under 35 U.S.C. 154(b) by 72 days.

(21) Appl. No.: 16/175,735

(22) Filed: Oct. 30, 2018

(65) Prior Publication Data

US 2019/0118081 A1 Apr. 25, 2019

Related U.S. Application Data

(63) Continuation of application No. 16/049,652, filed on Jul. 30, 2018, now Pat. No. 10,159,896, which is a continuation of application No. 15/448,539, filed on Mar. 2, 2017, now Pat. No. 10,226,693.

(51) Int. Cl.
*A63F 13/24* (2014.01)
*A63F 13/25* (2014.01)

(52) U.S. Cl.
CPC .............. *A63F 13/24* (2014.09); *A63F 13/25* (2014.09); *A63F 2300/1043* (2013.01)

(58) Field of Classification Search
CPC .................................. A63F 13/24; A63F 13/25
See application file for complete search history.

(56) References Cited

U.S. PATENT DOCUMENTS

| | | |
|---|---|---|
| 2010/0321899 A1 | 12/2010 | Vossoughi et al. |
| 2013/0147610 A1 | 6/2013 | Grant et al. |
| 2015/0084900 A1 | 3/2015 | Hodges et al. |
| 2015/0283458 A1 | 10/2015 | Burgess et al. |
| 2016/0351362 A1 | 12/2016 | Tsai et al. |

*Primary Examiner* — William H McCulloch, Jr.
*Assistant Examiner* — Yingchuan Zhang
(74) *Attorney, Agent, or Firm* — Knobbe, Martens, Olson & Bear LLP

(57) ABSTRACT

Videogame controllers with smart trigger stops may include: a housing including A trigger, the trigger movable along a path of travel; a sensor configured to detect the position of the trigger and to generate a signal representing trigger position; a processor configured to interpret signals generated by the sensor and cause an output signal to be transmitted to a gaming console; a trigger-stop that is movable between an engaged position and a disengaged position, the trigger-stop in the disengaged position allowing the trigger to move along the entire path of travel, the trigger-stop in the engaged position blocking the trigger from moving along the entire path of travel; and a switch coupled with the housing and the trigger-stop, wherein movement of the trigger-stop from the disengaged position to the engaged position flips the switch and causes the processor to map received signals to generated signals in a different manner.

11 Claims, 16 Drawing Sheets

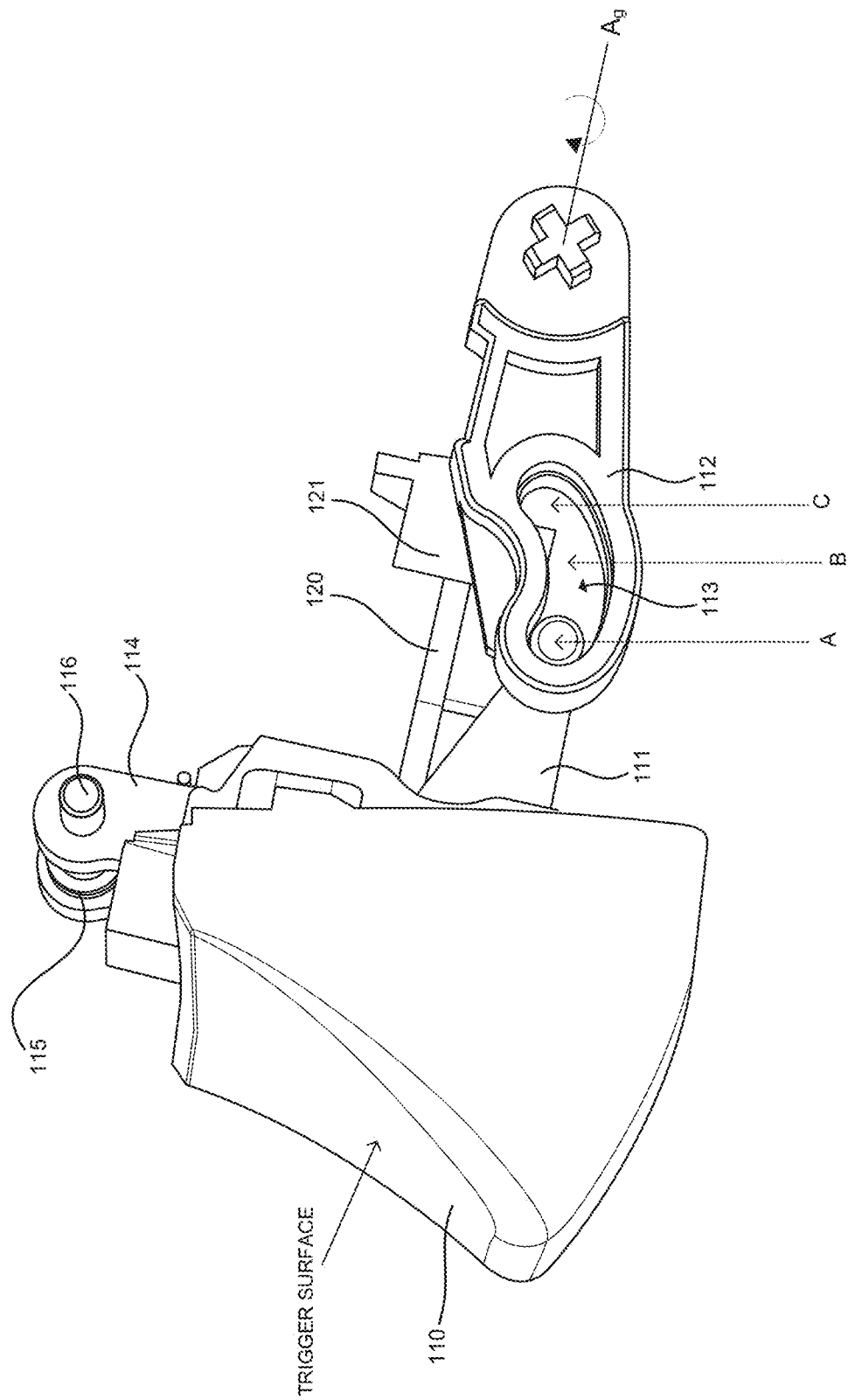

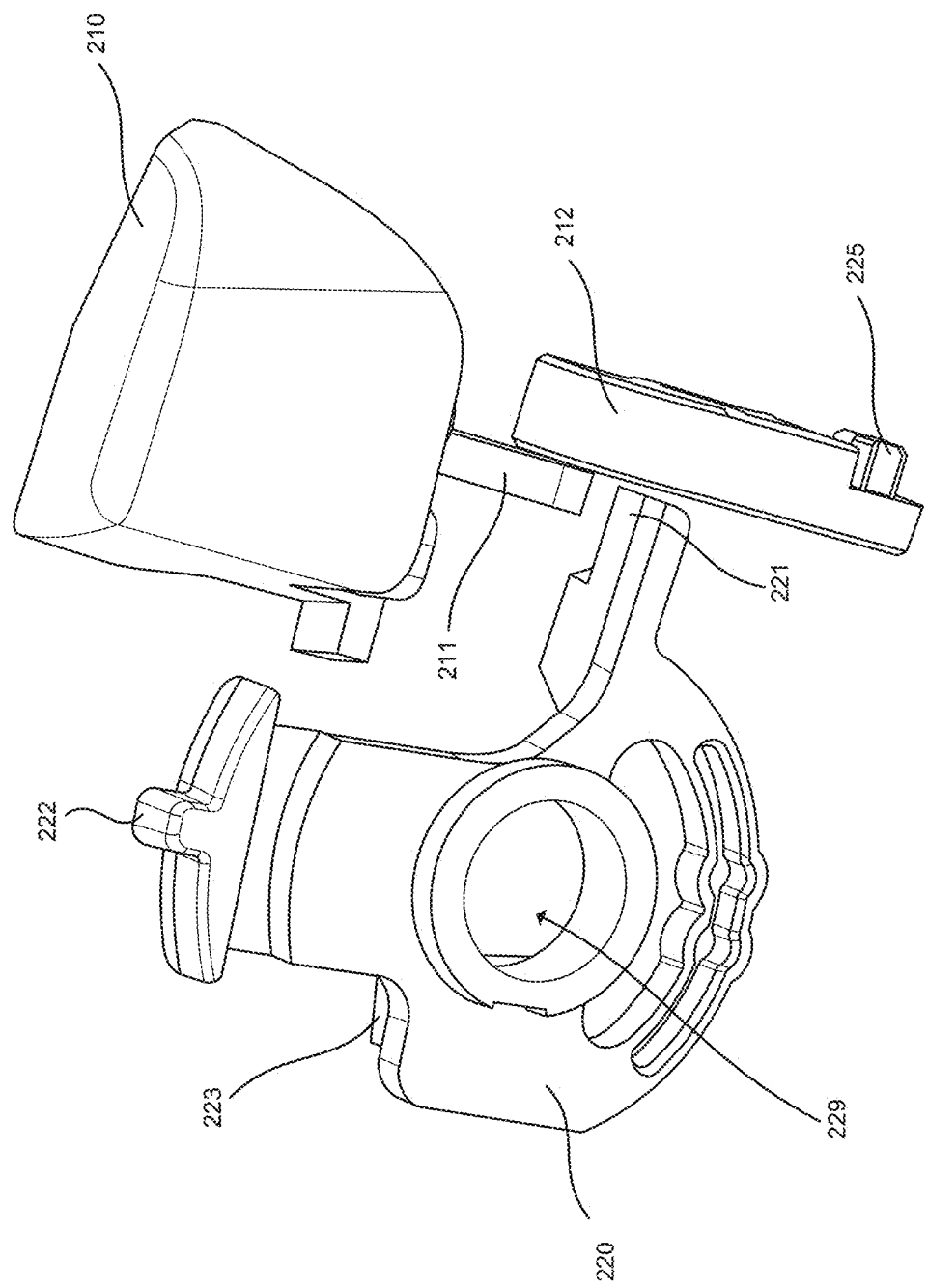

SMART TRIGGER-STOPS FOR VIDEOGAME CONTROLLERS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates generally to videogame controllers, and more particularly various embodiments disclosed herein relate to trigger-stop technologies for videogame controllers.

BACKGROUND OF THE DISCLOSURE

Modern videogames have become increasingly complex, and so too have the controllers used to play them. Videogame controllers often include a plurality of buttons, paddles, thumb-sticks, joysticks, wheels, pads, triggers and/or dials (collectively referred to herein as "controls") that may be pressed, pulled, turned or otherwise maneuvered by a user to activate various functions within the videogame being played. As the controls are maneuvered, electrical signals are generated by the controller circuitry and transmitted to the gaming console (e.g., Microsoft Xbox 360®, Sony PS4®, Nintendo Wii®, and/or any other computing device, etc.). The console interprets the signals and effectuates the operations or functionality within the videogame that correspond to the control(s) that were pressed by the user.

Some controls are configured to generate signals in accordance with a step-function (i.e., a binary approach), while others generate a signal in accordance with a gradient (i.e., a continuous approach). For example, buttons generally generate signals in accordance with an on-off or step-function approach (e.g., signal output when pressed "on" and no signal output when "off"). Triggers and joysticks, on the other hand, often generate signals in accordance with a gradient so that the signal strength gradually increases as the trigger is gradually pulled/pushed further in a given direction by the user (e.g., signal output strength/amplitude gradually increasing from 0% to 100% (of peak output) as the trigger is pulled from 0% (un-pulled) to 100% (fully-pulled)). The signal gradient can track trigger pull in accordance with a linear, nonlinear, exponential, or any other relationship. The way the signal output changes as the trigger is pulled back by a user will often be referred to herein as the "mapping scheme" or "mapping profile."

The signal gradient provided by gaming triggers and/or joysticks finds its use in functionality that calls for change by degrees, or gradual ascents/descents of given functionality within the game. For instance, in a car racing videogame the triggers may be used to control the "throttle" of the car being driven by the player. Thus, instead of only having the option to fully activate or fully deactivate the throttle (as would be the case if a button were to be used for this functionality instead of a trigger), a user may make finer adjustments to the throttle by pulling the trigger back to a greater or lesser degree, and thereby change the car's speed/acceleration to a greater or lesser degree, as desired.

In some instances, however, triggers and/or joysticks are mapped to functions within the game that don't necessarily call for a signal gradient. For instance, often times in combat games the trigger of the controller is used as the trigger of the weapon the player is using in the game. So, for example, although a gradually increasing signal may be generated as the trigger is pulled further back by the user, the weapon does not actually fire until the signal reaches a certain level (i.e., the trigger is pulled back to or beyond a threshold distance, e.g., 90% of the travel path distance); thus, the user's pull of the trigger up to that point doesn't activate any gaming functionality. Because of extra time that is wasted in pulling the trigger all the way back to the threshold point each time weapon activation is desired, competitive gamers have expressed frustration that the time cost undermines their performance.

Though it is noteworthy that in some instances the trigger may not actually need to be pulled all the way back to activate the function desired (e.g., in games where the weapon fires as soon as the trigger signal reaches a certain activation threshold that is something less than 100% signal output, for instance, if signal strength≥60% maximum signal strength, the weapon fires), it is nevertheless a user's natural inclination to pull the trigger all the way back (i.e., until it stops or cannot be pulled any further) before releasing it. This is because the activation threshold may be different among some videogames, and because without haptic feedback of some sort it is very difficult for a user to determine how far back he/she has pulled the trigger at any given instant during a fast-paced game. As noted, the time it takes to pull the trigger all the way back to activate a weapon is often considered wasted time by many gamers, and such time costs can undermine performance in games where response time is crucial. Thus, competitive gamers have expressed an interest in "hair-trigger" type functionality for triggers used in such fast-paced and response-time intensive games. To meet this need, two basic solutions have emerged.

One solution is a trigger-button swap. That is, the triggers on the gaming controllers are replaced with simple buttons, thereby foregoing the gradient styled mapping profile in favor of a button that need only be clicked by the tap of a finger in order to generate a signal at full strength (i.e., in a step-function manner). While this reduces the overall time required to fire the weapon by reducing the distance the user must press or pull the control for full activation (this distance also referred to herein as the "travel path" or "path of travel"), it nevertheless comes with many disadvantages. One disadvantage of this approach is that it eliminates the gradient feature that is often desirable in other games (e.g., for racing games).

Another solution that has emerged is the use of a trigger-stop. A trigger-stop is a mechanical device, often a screw or pin, that is placed within the travel path of the trigger such that the trigger is stopped at some point before it reaches the end of the original travel path as it is being pulled. This reduces the trigger's travel path (and thereby the time it takes to operate the trigger), but also comes with several drawbacks. One drawback is that the trigger may sometimes fail to fire the weapon (or activate other functionality it is mapped to) because the signal generated by the trigger is diminished and may not be adequate to activate the functionality of a particular game. For example, assuming a linear mapping profile, if a trigger-stop was used to limit a trigger so that it could only be pulled back to 50% of the original travel path (such that a signal of only 50% the maximum strength is produced—e.g., 0.5 my if the max strength is 1.0 mv), but the videogame being played was programmed to fire the weapon only when the signal rose above 0.9 mv (i.e., signal strength>90% of the max signal in the above example), then the trigger-stop would prevent the user from firing his/her weapon even if pulled all the way to the trigger-stop. So the controller may work for some games, but not for others.

BRIEF SUMMARY OF THE EMBODIMENTS

According to various embodiments of the present disclosure, a gaming controller implementing the disclosed technology may include: a housing; a trigger coupled with the housing, the trigger movable along a path of travel; a sensor configured to detect the position of the trigger along the path of travel and to generate a signal representing trigger position; a processor configured to interpret signals generated by the sensor and cause an output signal to be transmitted to a gaming console; a trigger-stop coupled with the housing, the trigger-stop movable between an engaged position and a disengaged position (the trigger-stop in the disengaged position allowing the trigger to move along the entire path of travel, and the trigger-stop in the engaged position blocking the trigger from moving along the entire path of travel); and/or a switch coupled with the housing and the trigger-stop, wherein movement of the trigger-stop from the disengaged position to the engaged position flips the switch from a first mode to a second mode, and movement of the trigger-stop from the engaged position to the disengaged position flips the switch from the second mode to the first mode; and wherein the switch in the first mode causes the processor to effectuate signal mapping and transmission in accordance with a first mapping profile, and the switch in the second mode causes the processor to effectuate signal mapping and transmission in accordance with a second mapping profile.

In accordance with some embodiments, the trigger-stop may include a lever (or slider, or other component) that extends through the housing such that the trigger-stop can be moved between the engaged position and the disengaged position by moving the lever from a first lever position to a second lever position. The trigger-stop may be coupled to a lever that extends through the housing such that the trigger-stop can be moved between the engaged position and the disengaged position by moving the lever from a first lever position to a second lever position.

In accordance with some embodiments, the trigger-stop may be moved between the engaged position and the disengaged position by moving along a track with which the trigger-stop is coupled. In accordance with some embodiments, the trigger-stop can be moved between the engaged position and the disengaged position by rotating the trigger-stop about an axle with which the trigger-stop is coupled.

In accordance with some embodiments, the switch includes a slider and the trigger-stop includes an aperture within which the slider may be at least partially disposed, and wherein the movement of the trigger-stop from the disengaged position to the engaged position causes the slider to move from a first slider position to a second slider position, and wherein movement of the slider from the first slider position to the second slider position causes the switch to flip from the first mode to the second mode.

In accordance with some embodiments, the path of travel along which the trigger may be moved is defined, in part, by a trigger guide (which may or may not be coupled with the housing). In some instances, movement of the trigger (or object coupled to the trigger) along the path of travel causes the trigger guide to move, and the sensor may detect the position of the trigger along the path of travel by detecting movements of the trigger guide that correspond to the position of the trigger.

In accordance with some embodiments, the first mapping profile defines a relationship whereby a first signal generated by the sensor may be mapped to a transmission signal having an attribute with a first value that corresponds to the position of the trigger relative to the entire travel path; and the second mapping profile defines a relationship whereby the first signal generated by the sensor may be mapped to a transmission signal having an attribute with a second value that corresponds to a trigger position different from the actual the position of the trigger relative to the entire travel path.

In accordance with some embodiments, for a given signal generated by the sensor corresponding to the position of the trigger along the path of travel, the signal transmitted to the console if generated in accordance with the first mapping profile is different than the signal transmitted to the console if generated in accordance with the second mapping profile.

Some embodiments of the present technology may be implemented as a system comprising: a videogame console operatively coupled to a display; a videogame controller operatively coupled to the videogame console, the videogame controller comprising: a housing; a trigger coupled with the housing, the trigger movable along a path of travel; a sensor configured to detect the position of the trigger along the path of travel and to generate a signal representing trigger position; a processor configured to interpret signals generated by the sensor and cause an output signal to be transmitted to the videogame console; a trigger-stop coupled with the housing, the trigger-stop movable between an engaged position and a disengaged position, the trigger-stop in the disengaged position allowing the trigger to move along the entire path of travel, the trigger-stop in the engaged position blocking the trigger from moving along the entire path of travel; and/or a switch coupled with the housing and the trigger-stop, wherein movement of the trigger-stop from the disengaged position to the engaged position flips the switch from a first mode to a second mode, and movement of the trigger-stop from the engaged position to the disengaged position flips the switch from the second mode to the first mode; wherein the switch in the first mode causes the processor to effectuate signal mapping and transmission in accordance with a first mapping profile, and the switch in the second mode causes the processor to effectuate signal mapping and transmission in accordance with a second mapping profile.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following Figures. The drawings are provided for illustration purposes only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the Figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

FIG. 4A illustrates a magnified perspective side view of an example trigger and trigger-stop assembly in accordance with one or more embodiments of the present disclosure.

FIG. 8C illustrates a magnified perspective bottom view of the example trigger and trigger-stop assembly depicted in FIG. 8B, in accordance with one or more embodiments of the present disclosure.

The Figures are not intended to be exhaustive or to limit the invention to the precise form disclosed. It should be understood that the invention can be practiced with modification and alteration, and that the disclosed technology be limited only by the claims and the equivalents thereof.

The drawings and examples described herein are provided to facilitate the reader's understanding of the disclosed technology, and shall not be considered limiting of the breadth, scope, or applicability of the present disclosure to variations or modifications upon the same that one of ordinary skill in the art would appreciate upon review of this disclosure. It should also be noted that for clarity and ease of illustration these drawings are not necessarily made to scale.

DETAILED DESCRIPTION

The present disclosure is directed toward smart trigger-stops and related systems and methods for altering or enhancing videogame controller performance. Embodiments of the disclosed technology include a mechanical trigger-stop that may be engaged by triggering an actuator accessible to a user on the exterior of controller (e.g., moving a lever, a pin, a post, a slider, a knob, etc., touching a capacitive or other touch-sensitive switch, applying pressure to a squeeze switch, and so on). The controller may be configured such that triggering the actuator not only imposes a manual trigger-stop on the trigger, but can also engage a trigger-stop mode of the controller. For example, triggering the actuator may actuate a switching mechanism (e.g., a switch, relay, electronic signal, etc.), of the controller that imposes a different signal mapping scheme/profile from the scheme/profile applied under normal operation (i.e., when the trigger-stop is not engaged). As another example, triggering the actuator may set a bit or otherwise signal a processor in the controller to apply a different signal mapping scheme/profile to the affected trigger.

That is, embodiments may be implemented such that actuating the trigger-stop not only reduces the amount the trigger may be pulled before being stopped (e.g., to afford quicker response times), but also modifies the signal mapping scheme/profile (i.e., a trigger-stop mode) so that the controller can generate a signal of sufficient strength (or other quality) to activate the relevant functionality despite the limited path along which the trigger may move on account of the trigger-stop having been engaged. Embodiments may also be implemented in which the actuator may also be used to disengage the trigger-stop and/or trigger-stop mode.

Figure 1A:
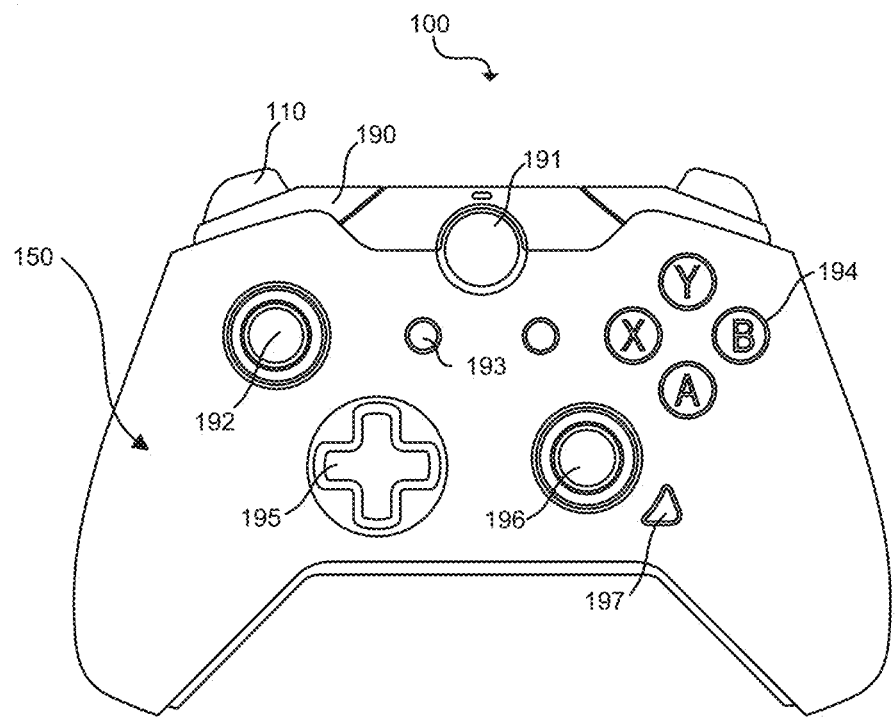
FIG. 1A illustrates a top perspective view of an example videogame controller including smart trigger-stops in accordance with one or more embodiments of the present disclosure.

FIG. 1A illustrates a top perspective view of an example videogame controller 100 with which the smart trigger-stop systems and assemblies of the present disclosure may be implemented, in accordance with one or more embodiments. As shown, controller 100 may include a housing 150 configured with handles that may be held by a user. Controller 100 may also include controls such as, for example, one or more buttons (e.g., buttons 191, 193, 194, 197), joysticks (e.g., joysticks 192, 196), directional pads (e.g., directional pad 1916), bumpers (e.g., bumper 190) and triggers (e.g., left trigger 110) that may be exposed or accessible through the top and/or forward face of housing 150 such that a user may maneuver them with his/her fingers. One of more of these controls may be operatively coupled (e.g., mechanically and/or electrically coupled) to one or more internal components housed within and carried by housing 100.

For example, trigger 110 may be physically coupled with the housing 150 via a hinge, and electrically coupled with an internal sensor configured to detect trigger 110's movements and generate or affect signal(s) corresponding to such movements (or actuate a sequence of steps that results in such signal(s) being generated (e.g., via a transducer) or affected (e.g., by a variable resistor)). As may be observed, trigger 110 may be depressed or otherwise displaced to a certain degree/distance when pulled or pressed by a user, and then may spring back to its resting position when released. The path along which trigger 110 (or a portion of trigger 110) moves when pulled is referred to herein as the "travel path" or "path of travel."

In general, the controller design generally defines the maximum distance the trigger may be pulled or otherwise moved along the travel path before being stopped or blocked by another structure (e.g., blocked by a portion of the housing, or a structure coupled with the housing such as a guide component). As explained in more detail with reference to the Figures that follow, a smart trigger-stop system may be deployed in connection with controller 100 in order to "stop" the movement of trigger 110 at some point before it reaches the maximum travel distance, thereby reducing the length of travel trigger 110 may move upon before hitting a mechanical stop. In some embodiments, such smart trigger-stop systems may be engaged by moving or affecting an actuator operatively coupled thereto that is accessible to a user from outside of the controller housing, an example of which is shown in FIG. 1B (see, e.g., slider 122).

Figure 1B:
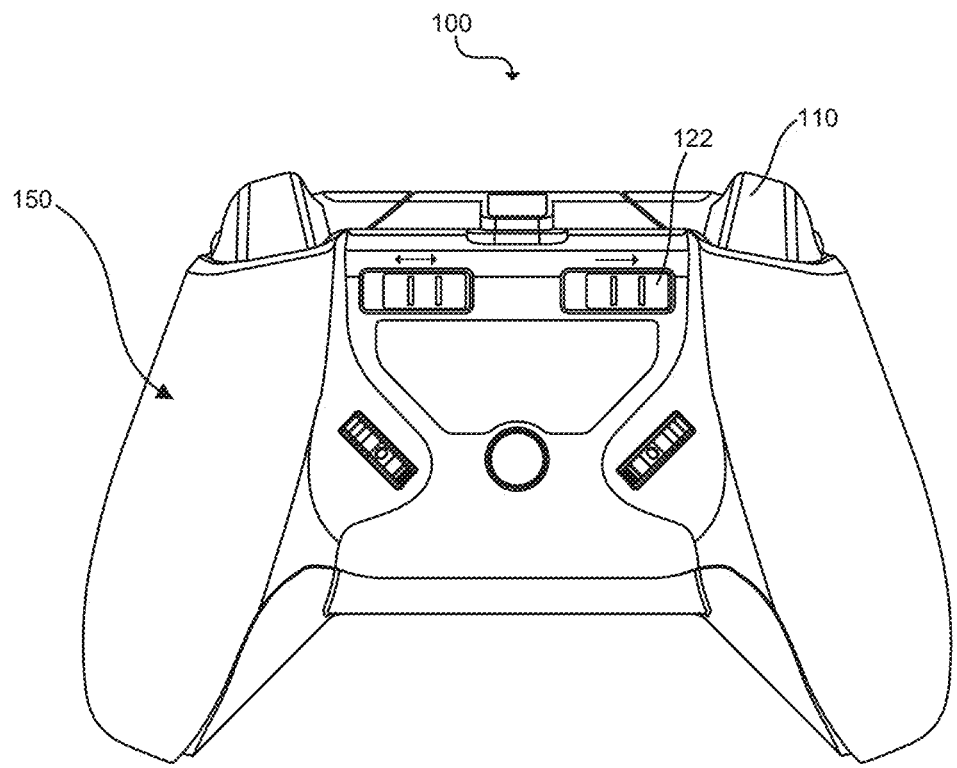
FIG. 1B illustrates a bottom perspective view of the example videogame controller depicted in FIG. 1A, in accordance with one or more embodiments of the present disclosure.

FIG. 1B illustrates a bottom perspective view of the example videogame controller depicted in FIG. 1A. As depicted, controller 100 may include one or more exposed actuators (e.g., controls or other components) operatively coupled thereto that is/are accessible to a user via the exterior of the housing 150. In the illustrated example, slide switch 122 is provided as an actuator to engage or disengage a trigger-stop function. Although the actuator in this example is illustrated as a slide switch, other switches or mechanisms—which may be mechanical in nature (physical slider), or electrical in nature (e.g., touch sensor), or a combination of both—can be provided as an actuator to engage or disengage the trigger-stop function. In this example, slide switch 122 may be moved from side-to-side along an exterior portion of housing 150. Slide switch 122 may comprise one or more features or be operatively coupled to one or more components such that movement of the slide switch 122 from side-to-side (i.e., from a first position to a second position, and vice versa) causes a trigger-stop mode for the trigger to engage or disengage.

For example, moving slide switch 122 toward trigger 110 (into the position shown) may move an internal trigger-stop structure into an engaged position, while moving slide switch 122 away from trigger 110 (back toward the center of the device) may move the internal trigger-stop structure into a disengaged position. Further, triggering an actuator (such as by moving slide switch 122 in the illustrated example to effectuate the movement of a corresponding trigger-stop structure) may, in some embodiments, also cause the controller to impose a signal mapping scheme/profile that is different from the scheme/profile applied under normal operation (i.e., engaging a trigger-stop mode that is different than a normal operation mode).

The trigger-stop actuator may be a distinct mechanical structure that is physically coupled (directly or indirectly) with the corresponding trigger-stop mechanism to facilitate such movements, or it may be an extension of the trigger-stop structure (integral to the structure) that is configured to extend through the shell of the housing 150 so that a portion is exposed and/or accessible to a user from a position outside the housing 150. In some example embodiments, a tool such as a screwdriver or hex key may be needed to access/operate the trigger stop actuator, and in some example embodiments the actuator may be accessed/operated by fingers of a user's hand. In an example embodiment, the trigger-stop actuator may be configured to be communicatively coupled to the corresponding trigger-stop mechanism such that it sends a signal (e.g., electrical, RF, optical or otherwise) to the trigger-stop mechanism to engage or disengage the trigger-stop mode.

It should also be noted that the trigger-stop actuator (e.g., an exposed component or extension of the trigger-stop structure) need not be in the form of a slide switch as shown in the illustrated example. The trigger-stop actuator may be implemented using any of a number of different actuators such as, for example, a knob, a lever, a switch, a handle, a dial, a capacitive switch, a squeeze switch, an optical sensor, or any other structure that may be implemented to allow the user to change the length of the path the trigger may travel, and/or the mode of the controller.

Moreover, although the example trigger-stop actuator shown in FIG. 1B (the slide switch 122) is depicted to suggest that it may be moved by the finger of a user, the exposed components of the present disclosure are not limited to such implementations. For example, in some embodiments the trigger-stop actuator may require a tool (e.g., hex key, a screw driver, etc.), key or other implement to trigger the actuator. As explained in further detail with reference to example embodiments shown in FIGS. 2-4C, trigger-stop actuators (such as slide switch 122) may be triggered (e.g., maneuvered, touched, etc.) By a user to effectuate a movement of a trigger-stop mechanism operatively coupled thereto.

Figure 2:
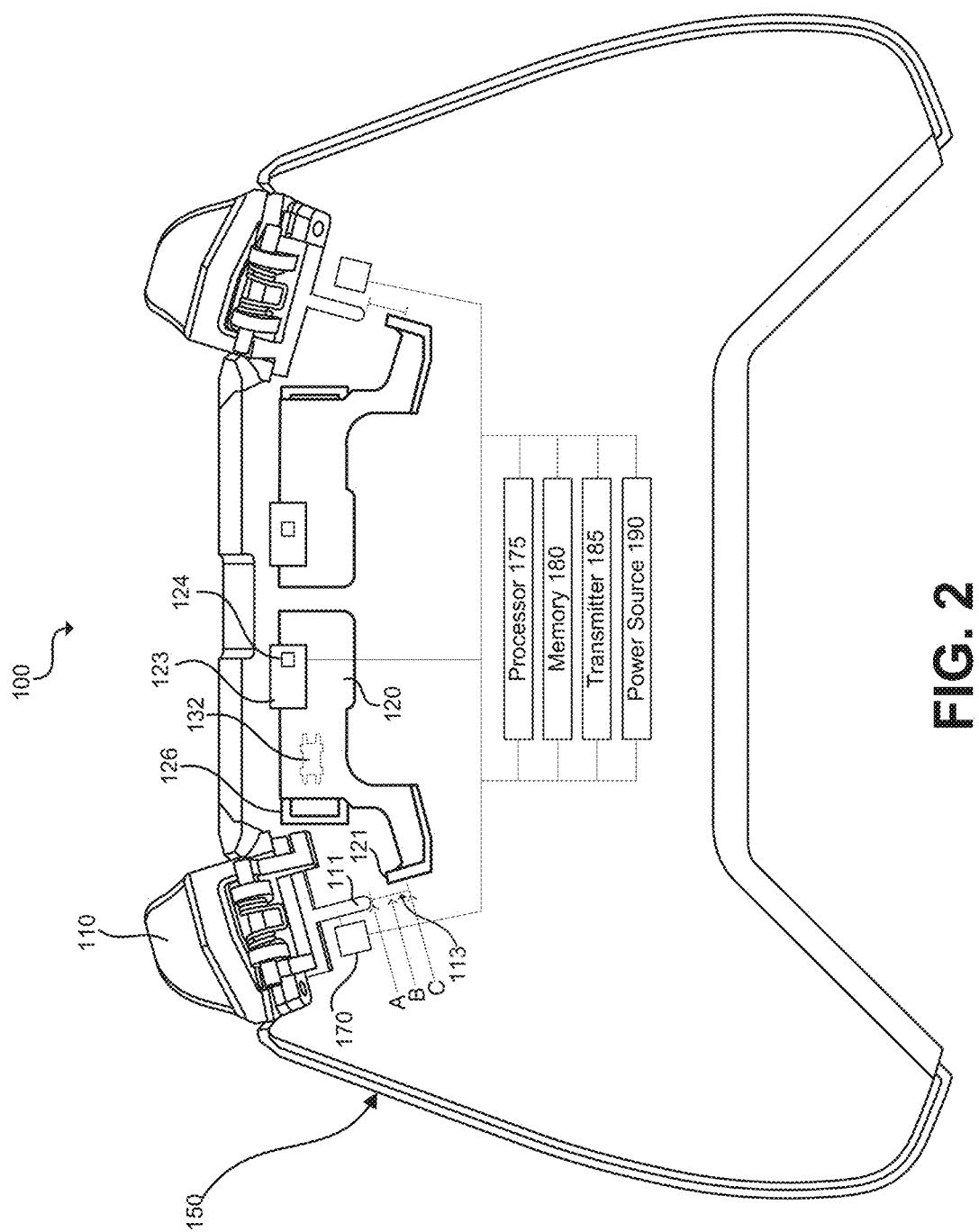
FIG. 2 illustrates a top perspective view of the example videogame controller shown in FIG. 1A, here depicted with a top portion of the housing removed so as to expose various internal components relating to the smart trigger-stop technology as implemented in accordance with one or more embodiments of the present disclosure.

FIG. 2 illustrates a top perspective view of the example videogame controller shown in FIG. 1A with a top portion of the housing 150 removed to expose example trigger-stop mechanism components in accordance with one or more embodiments of the present disclosure. As shown in this example, gaming controller 100 may include one or more triggers 110, trigger-stops 120, switches 123, sensors 170, processors 175, memory 180, transmitters 185, and/or power sources 190. Any one or more of the foregoing may be mechanically and/or electrically coupled with one another and/or with housing 150 of gaming controller 100, and may operate alone or together (e.g., as described herein) to facilitate one or more implementations of the smart trigger-stop technology disclosed herein. For simplicity, various electrical components in the exemplary embodiment illustrated are depicted symbolically using boxes (e.g., sensor 170, processor 175, etc.).

As shown in this example, trigger-stop 120 may be movably coupled with housing 150 such that a user may move trigger-stop 120 from a disengaged position into an engaged position (i.e., from a first position into a second position) and vice versa by moving the slide switch 122 from side-to-side as discussed above (reference numeral 132 in FIG. 2 pointing to an outline of slide switch 122's coupling point on the underside of trigger-stop 120).

Figure 3:
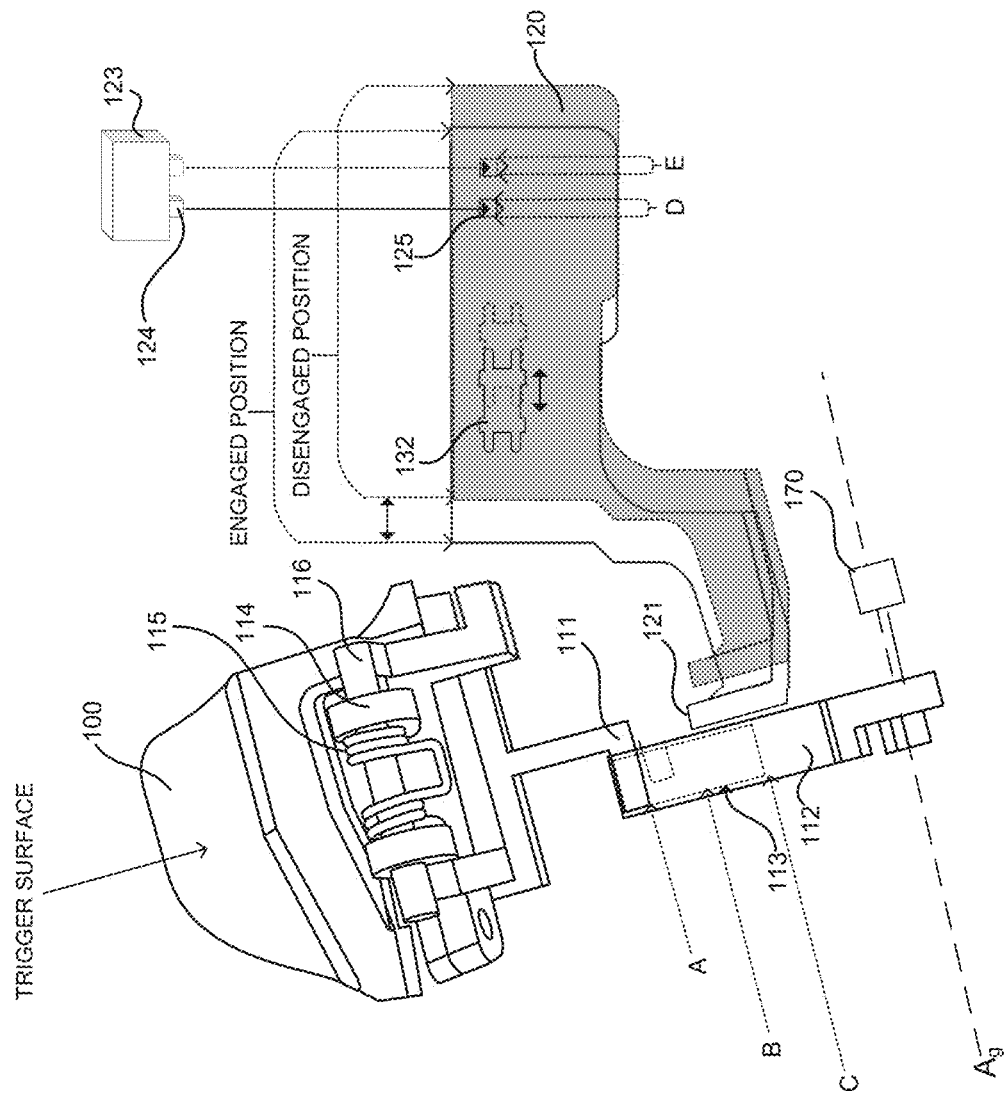
FIG. 3 illustrates a magnified view of various internal components shown in FIG. 2 and relating to the smart trigger-stop technology as implemented in accordance with one or more embodiments of the present disclosure.

FIG. 3 illustrates a magnified view of various internal components and features of the controller shown in FIG. 2 and relating to the smart trigger-stop technology as implemented in accordance with one or more embodiments of the present disclosure. As may be observed from the example illustrated in FIG. 3, moving trigger-stop 120 from the disengaged position to the engaged position (e.g., moving the trigger-stop 120 as depicted to the left along track 126) may: (i) cause a portion of trigger-stop 120 to move into a portion of trigger 110's travel path (the travel path indicated symbolically by the broken line referenced as numeral 113) and thereby block or otherwise reduce the degree to which trigger 110 may be pulled/depressed, and/or (ii) cause a switch 123 coupled to trigger-stop 120 to be flipped and thereby signal to processor 175 that the trigger-stop 120 is in the engaged position and that signal transmissions responsive to trigger movements should be adjusted accordingly (i.e., the signals should be processed in accordance with a different signal mapping scheme/profile).

In the depicted embodiment, trigger 110 includes arm extension 111, which may move along travel path 113 as the trigger 110 is pressed by a user. When the trigger-stop 120 is in a disengaged position, trigger 110 and arm extension 111 may move along their entire travel path freely. That is, trigger arm extension 111 may move freely from Position A (the resting position) to Position C (the fully pulled position) without being stopped or blocked along the way. On the other hand, when the trigger-stop 120 is moved into the engaged position, a blocking portion 121 of trigger-stop 120 may fall within a portion of trigger 110's travel path 113 such that the trigger 110 is stopped before reaching the fully pulled position (Position C). That is, trigger arm extension 111 may be stopped or blocked at Position B as the trigger moves along the travel path 113, thereby reducing the total distance the trigger may travel before being stopped. As such, a user may be able to receive tactile feedback on their trigger finger (indicating the trigger has been sufficiently pressed) more quickly than when the trigger-stop is not engaged. In particular, the user may feel the impact between the blocking portion 121 of the trigger-stop 120 and the arm extension 111 of trigger 110 more quickly than they might feel the impact of the arm extension 111 with some other native feature of the controller demarking the end of the travel path 113 at Position C. Because the travel path of trigger 110 may be reduced by engaging trigger-stop 120, a user may fully engage the trigger controls of controller 100 more quickly and with greater efficiency.

Similarly, moving trigger-stop 120 from the engaged position to the disengaged position (e.g., moving the trigger-stop 120 as depicted to the right along track 126 (shown in FIG. 2)) may: (i) cause the blocking portion 121 of trigger-stop 120 to move out of trigger arm extension 111's travel path 113, thereby allowing the trigger 110 to be pulled back along the entire travel path and (ii) cause switch 123 to be flipped back and thereby signal to processor 175 that the trigger-stop 120 is in the disengaged position and that signal transmissions responsive to trigger movements may be processed in accordance with the original/normal signal mapping scheme (i.e., the normal trigger mode may be reestablished).

The blocking portion 121 of trigger-stop 120 may be any portion or feature of the trigger-stop 120 structure (e.g., an edge, an arm, an extension, a lip, a corner, a flange, etc.), or any separate component coupled with and/or protruding from the trigger-stop 120 structure. For example, as shown in FIG. 2, blocking portion 121 of the trigger-stop 120 may be a flange that extends from an elbow like structure comprising part of the trigger-stop 120. When the trigger-stop 120 is moved into the engaged position, a leading edge of the flange falls within the travel path 113 of the trigger 110 such that when the trigger 110 is pulled back by a user, the trigger 110 is partially blocked from its full range of movement along the travel path 113 by the imposition of the blocking portion 121 (the flange) of the trigger-stop 120.

Although the examples depicted with reference to FIG. 2 use a mechanical coupling to slide a trigger stop 120 into place to block the travel of a trigger 110, other examples can use electromechanical solutions. For example, a solenoid, voice coil actuator or other like device can be used to implement the trigger stop mechanism. Consider the example of a voice coil actuator. In this case, the trigger stop actuator can be configured to send an electrical signal to the voice coil. Current in the voice coil from the signal (directly or indirectly) causes the shaft of the actuator to move into the path of the trigger (e.g., into path 113) to block the trigger from its full range of motion. To disengage, another signal from the trigger stop actuator can be used to reverse the direction of current in the coil and remove the actuator shaft from the path of the trigger.

As noted above, movement of the trigger-stop 120 into an engaged position may cause a switch 123 coupled to trigger-stop 120 to be flipped and thereby signal to processor 175 that the trigger-stop 120 is in the engaged position and that signal transmissions responsive to trigger movements should be adjusted accordingly (i.e., the signals should be processed in accordance with a different signal mapping scheme/profile). As shown, in some embodiments switch 123 may be positioned or otherwise arranged relative to the trigger-stop 120 and/or actuator in a manner that causes the switch 123 to be flipped back and forth as the trigger-stop 120 is moved into and out of the engaged position and disengaged position.

For example, trigger-stop 120 may be configured with an aperture fitted to receive a slider knob 124 of switch 123. As trigger-stop 120 moves into the engaged position (i.e., to the left in FIG. 2), the trigger-stop 120 structure defining the aperture may push the slider knob 124 of switch 123 and thereby flip the switch 123. Similarly, as trigger-stop 120 moves from the engaged position back into the disengaged position, trigger-stop 120 structure may push the slider knob 124 of switch 123 back and thereby flip the switch 123 into its original position (e.g., an "off" or "on" state, depending on design/preference). The reader should note that slider knob 124 and switch 123 will in some embodiments be different components than, although operatively coupled with, slide switch 122. In some embodiments there may be more or less than two (as shown here) switch type mechanisms operatively coupled with one another to carry out the functionality and technology disclosed.

Controller 100 may include a sensor 170 operatively coupled to trigger 110 and configured to detect trigger movements and generate a signal representative of such movements. Sensor 170 may be any type of sensor configured to detect movements of the trigger and transduce them into electrical signals representative of such movements, including but not limited to any one or more capacitive, resistive, inductive, piezoelectric, or optical sensors known in the art. For instance, sensor 170 may include one or more of a proximity sensor, a rotation sensor, an encoder, a photoelectric sensor, a capacitive displacement sensor, an optical sensor, a strain gauge, and the like. Sensor 170 may detect trigger 110 movements in any manner, directly or indirectly, including by detecting movements of one or more objects extending from or operatively coupled trigger 110 such as arm extension 111, guiding element 112 (shown in FIG. 3), a spring, a hinge, etc.). One of ordinary skill in the art after reading this description will appreciate the many ways in which various sensors may be employed to detect trigger movements, and it should be understood that any and all such implementations fall within the scope of the present disclosure. For example, instead of trigger-stop 120 engaging the slider knob 123 of switch 124—to effectuate a different mapping scheme—when the actuator (e.g., slide switch 122) is moved, the slide switch 122 may itself may have electrical contacts that when closed send a signal to the processor indicating the mode change (i.e., the change in the mapping scheme). The same may be implemented using a double pole switch that send a one or a ground to the processor. One of ordinary skill in the art after reading this description will appreciate that the present disclosure extends to all such variations, modifications, and implementations.

Signals generated by sensor 170 responsive to trigger 110's movements may be provided to processor 175 for processing. In some instances, the signal(s) generated by the sensor 170 undergo one or more pre-processing operations before being provided to the processor 175. The signals generated by sensor 170 and provided as input to processor 175 may be directly related the trigger's position along the travel path 113 (which may correspond directly to how far the trigger has been pulled/pressed back by the user). Processor 175 may process the signals received from the sensor 170 according to one or more signal mapping schemes/profiles before causing the transmitter 170 (via transmitter logic and circuitry configured for either wired or wireless communication) to transmit a corresponding signal to a connected gaming console.

The signal mapping scheme may be carried out or otherwise applied in any manner, including in some instances by processor 175 executing machine-machine-readable instructions stored in memory 180 (e.g., a computer program medium) that effectuate the signal mapping scheme. The signal ultimately conveyed to the gaming console (e.g., transmitted via transmitter 70) may be directly related to how far back the trigger is pulled/pressed. The gaming console may receive the signal from the transmitter and effectuate the gameplay functionality that corresponds to the trigger 110 movement detected (e.g., the degree of trigger pull detected).

Switch 123 may be operatively coupled with processor 175 such that the state/condition of the switch is known to the processor 175, and the processor 175 may process the signals generated by sensor 170 differently depending on the condition/state of the switch 123. For example, processor 175 may process the signals generated by sensor 170 in accordance with different machine-readable instructions (or in accordance with an alternative algorithm or rule nested in the same set of instructions), based on the condition/state of the switch 123. For instance, if trigger-stop 120 is in the disengaged position, the switch 123 may be in an "off" mode and, based on the "off" mode of the switch 123, processor 175 may execute a first subset of instructions that map trigger movements to transmission output signals in accordance with a first mapping scheme/profile (also referred to herein as a "first signaling profile"). On the other hand, if trigger-stop 120 is moved into the engaged position causing the switch 123 to flip into an "on" mode, processor 175 may execute a second set of instructions mapping the trigger movements to transmission output signals in accordance with a second mapping scheme/profile (also referred to herein as a "second signaling profile"). The "on" mode may correspond to the "trigger-stop mode", and the "off" mode may correspond to the "normal mode". The first signaling profile and the second signaling profile may be different. Example signaling profiles that may be implemented in accordance with one or more embodiments of the present disclosure are discussed in more detail below (with reference to FIGS. 5A-5C).

It will be understood by one of ordinary skill in the art that processor 175 may cause a signal to be transmitted to a gaming console (or to a dongle connected thereto) in any manner, including over a wired or wireless (via transmitter 70) channel. That is, in some embodiments the signals/information about trigger movements may be communicated to the gaming console via a wireless interface (e.g., a transmitter at the controller in communication with a receiver at the console), and in other embodiments the signals/information about trigger movements may be may communicated to the gaming console via a wired interface (e.g., a cable).

Trigger-stop 120 may be movably coupled with the housing 150 in any manner that allows it to be selectively positioned within the housing 150 to impede some movement of the trigger 110. As shown, in some embodiments the trigger-stop 120 may cause a switch 123 to be flipped (changing the mode) when moved into and/or out of one or more such positions. For example, housing 150 may be configured with a track 126 or rail that trigger-stop 120 can be movably coupled with such that trigger-stop 120 may be moved back and forth along the track 126 (i.e., the trigger-stop 120 may be moved from side-to-side along the track 126 (based on a user moving slider 122 back and forth), into and out of an engaged position).

Controller 100 may further include a power source 190 configured to enable operation of the various electronic components described above, among others. Power source 190 may be any power source. In some embodiments the power source 190 is a battery or other electrochemical cell. In other embodiments the power source 190 is provided by an ac line that may be plugged into an interface at the controller (not shown).

As noted, FIG. 3 illustrates a magnified view of example trigger and trigger-stop componentry, here depicting trigger-stop 120 in both an engaged position (unshaded) and a disengaged position (shaded) in accordance with one or more embodiments of the present disclosure. As may be observed, moving trigger-stop 120 from the disengaged position (shaded) to the engaged position (unshaded) causes the blocking portion 121 of trigger-stop 120 to move into trigger 110's travel path. The travel path 130 may be defined in part by an aperture of a guide element 112 within which an elbow extension or knob of arm extension 111 may be situated. In the engaged position, trigger-stop 120 will stop the trigger 110 along the travel path before it reaches the fully-pulled position (Position C). Additionally, moving trigger-stop 120 from the disengaged position into the engaged position may cause switch 123 (which may be mechanically or electrically coupled with trigger-stop 120) to be flipped. Flipping the switch into a different state/mode/ condition may signal to processor 175 that the trigger-stop 120 is in the engaged position and that the controller 100's signal transmissions responsive to trigger movement(s) should be adjusted accordingly (i.e., the signals should be processed in accordance with a modified signal mapping scheme (e.g., a different mode/profile)).

FIG. 3 illustrates that sensor 170 may be configured to detect trigger movements indirectly by measuring changes in another object or structure with which trigger 110 is operatively coupled (here, guide element 112 represents an exemplary other object). As shown, trigger 110 may be configured to interact with guide element 112 (e.g., the arm extension 111 configured with an elbow extension or knob fitted to nest within and glide along an aperture of guide element 112 as the trigger 110 is being pulled). As trigger 110 is pulled and the knob of arm extension 111 moves backward along travel path 113 (i.e., within the aperture of guide element 112), the guide element 112 may be moved (e.g., shifted, rotated, twisted, translated, etc.). In the example configuration shown, guide element 112 may rotate about an axis, $A_g$, as a result of trigger 110 being pulled/pressed. As depicted, sensor 170 may be operatively coupled with guide element 112 and configured to detect changes in guide element 112 caused by movements of the trigger. For example, sensor 170 may be configured to detect rotational movement of guide element 112 about axis, $A_g$, as trigger 110 is pulled back by a user. Sensor 170 may generate signal(s) representing such movements and processor 175 may receive and process the signal in accordance with a mapping scheme (i.e., a signaling profile).

As may be appreciated from reviewing FIG. 3, trigger 110 may be rotatably coupled to the housing 150 via a spring-loaded hinge assembly. The spring-loaded hinge assembly may include a pin 116 and barrel 114 configuration, with a spring 115 applying a force between housing 150 and trigger 110 that imposes a resistance to trigger depressions. Though not specifically depicted, spring-loaded hinge assembly may further comprise another barrel or sleeve member that is coupled to the housing and which holds the pin 116 in place relative to the housing. The barrel or sleeve member of the housing 150 and barrel 114 of trigger 110 may be fitted together to create a common channel through which pin 116 may disposed. Such spring-loaded trigger coupling mechanisms are commonly known, and one of ordinary skill in the art will appreciate that this and/or any other trigger coupling configuration may be used or implemented in connection with one or more embodiments of the present disclosure. Employing a spring-loaded hinge mechanism as shown, trigger 110 may be depressed at least partially into the housing when pulled or pressed by a user (e.g., by a user's finger pressing on the trigger surface to depress the trigger 110), and then return to its original position when not being pulled by a user (e.g., by the force imposed by spring 115).

Accordingly, as may be observed, the trigger-stop 120 mechanism of the present disclosure may be selectively moved into and out of an engaged position to block or otherwise limited certain movements of the trigger 110 as desired. As noted above, a switch 123 may be positioned or coupled with trigger-stop 120 such that movement of the trigger-stop 120 into and out of the engaged position causes a slider knob 124 of the switch 123 to be flipped back and forth. In some embodiments this may be effectuated by an aperture 125 or cutout within the trigger-stop 120 structure that is fitted to receive a portion of the slider 24 of switch 123. In operation, as trigger-stop 120 is moved from a disengaged position to an engaged position, the location of the aperture 125 moves from position d to position e and causes a movement of the slider knob 124 of switch 123 (i.e., thereby flipping the switch to display a different status/mode/condition). Flipping the switch into a different state/mode/condition in this manner may signal to processor 175 that the trigger-stop 120 is in an engaged position and that the controller 100's signal transmissions responsive to trigger movement(s) should be adjusted accordingly (i.e., the signals should be processed in accordance with a modified signal mapping scheme).

Figure 4B:
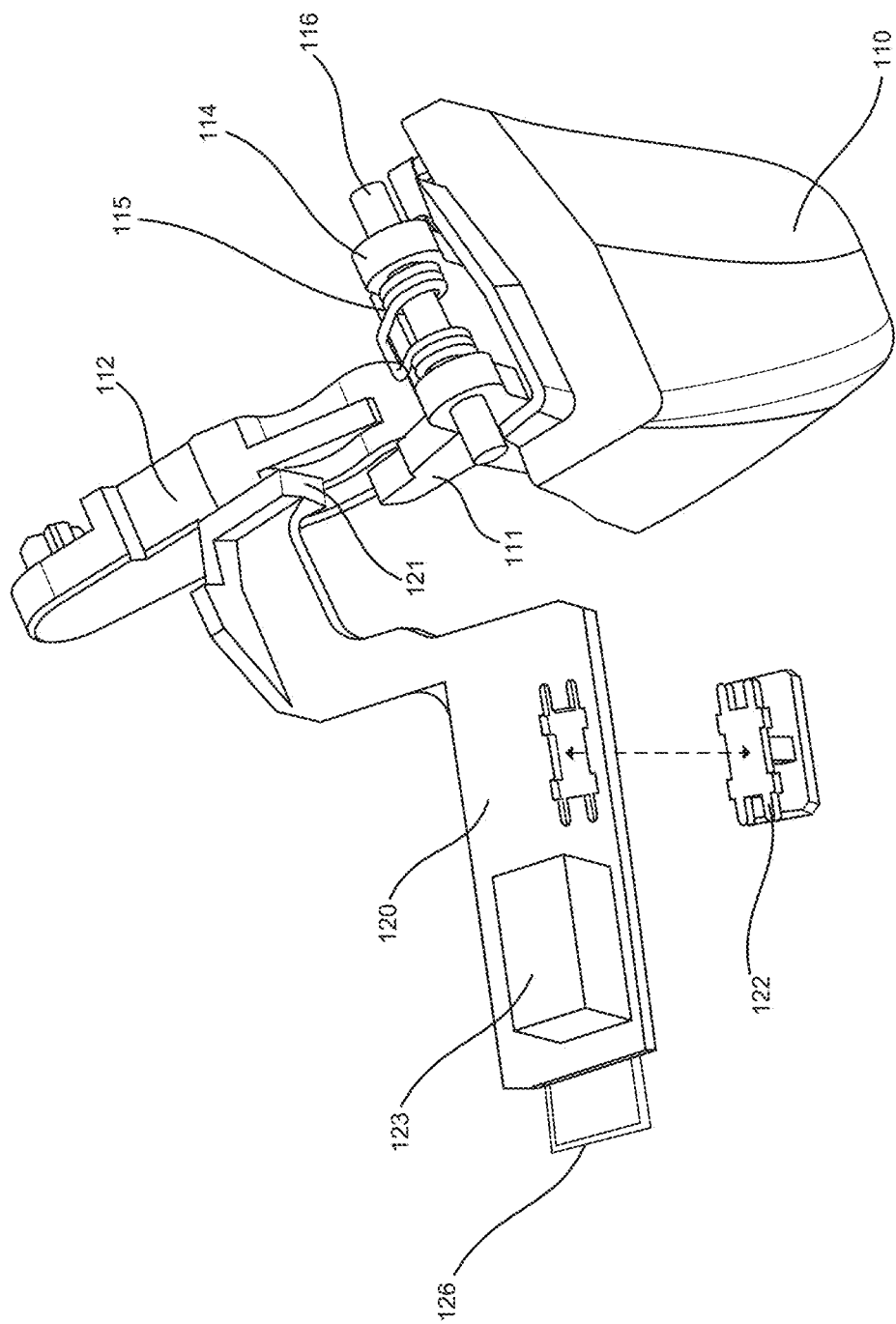
FIG. 4B illustrates a magnified perspective aerial view of the example trigger and trigger-stop assembly depicted in FIG. 4A, in accordance with one or more embodiments of the present disclosure.
Figure 4C:
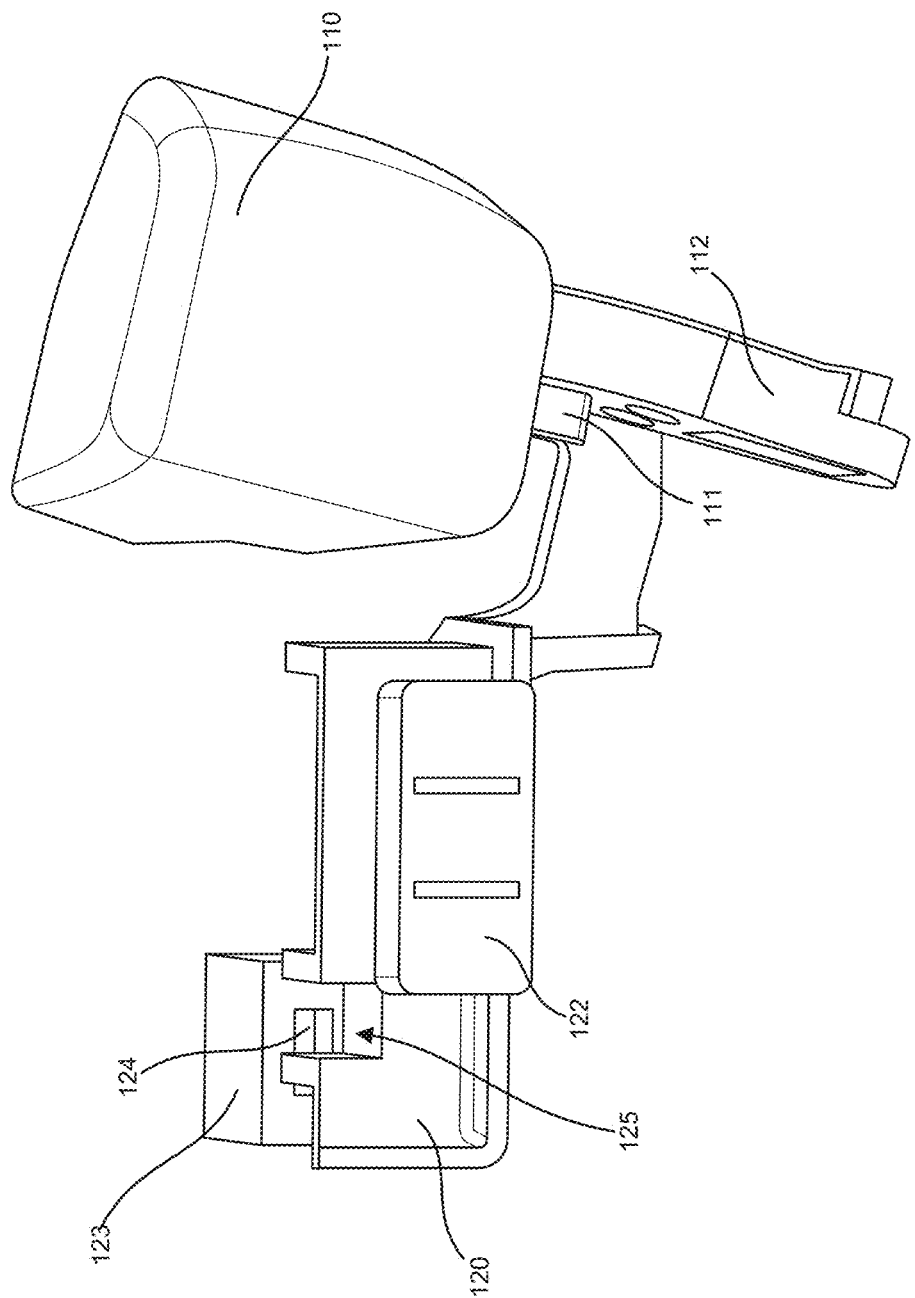
FIG. 4C illustrates a magnified perspective bottom view of the example trigger and trigger-stop assembly depicted in FIG. 4B, in accordance with one or more embodiments of the present disclosure.

FIG. 4A-4C illustrate various perspective views of the trigger and trigger-stop componentry shown in FIG. 3 in accordance with one or more embodiments of the present disclosure.

FIG. 4A illustrates a magnified perspective side view of the smart trigger-stop assembly shown in FIG. 3, the trigger in a released/unpressed position. As shown, in the unpressed position, the elbow knob of extension arm 111 is in Position A. As a user presses the upon the surface of trigger 110, the elbow knob of the extension arm 111 may move along the travel path 113 between Position A and Position C when the trigger-stop 120 is in a disengaged position. When the trigger-stop 120 is in an engaged position, extension arm 111 may be stopped along the travel path (e.g., extension arm 111 runs into blocking portion 121) such that elbow knob may only move along the travel path 113 from Position A to Position B. As elbow knob of arm extension 111 moves along the travel path 113 it may cause guide element 112 to rotate about an axis, $A_g$. Such rotations or other movements of the guide element 112 may actuate sensor 170, and sensor 170 (e.g., a transducer) may generate a signal representative of the degree to which trigger 110 moved along the path of travel (e.g., based on the rotation of guide element 112).

FIG. 4B illustrates a magnified perspective aerial view of the example trigger and trigger-stop assembly depicted in Figure A, in accordance with one or more embodiments of the present disclosure. The depicted view demonstrates how the trigger-stop 120 may be coupled to a slide switch 122, which in this example is configured to extend through the housing 150 of videogame controller 100 to enable a user to maneuver the trigger-stop 120 relative to the trigger 110 (e.g., along track 126). As shown, trigger-stop 120 may be integrated or mechanically coupled with a slide switch 122 that connects to the trigger-stop 120 structure at one end, and extends into and/or through an opening in housing 150 at another end such that it is accessible to a user.

FIG. 4C illustrates a magnified perspective bottom view of the example trigger and trigger-stop assembly depicted in FIG. 4B, in accordance with one or more embodiments of the present disclosure. The embodiment illustrated depicts the portion of the slider 122 that may extend through the housing to be made accessible to the user, consistent with the view depicted in FIG. 1B. As may be seen with reference to either or both of FIGS. 1B and 4C, slide switch 122 may extend through housing to enable a user to maneuver the trigger-stop 120 relative to the trigger 110.

Figure 5A:
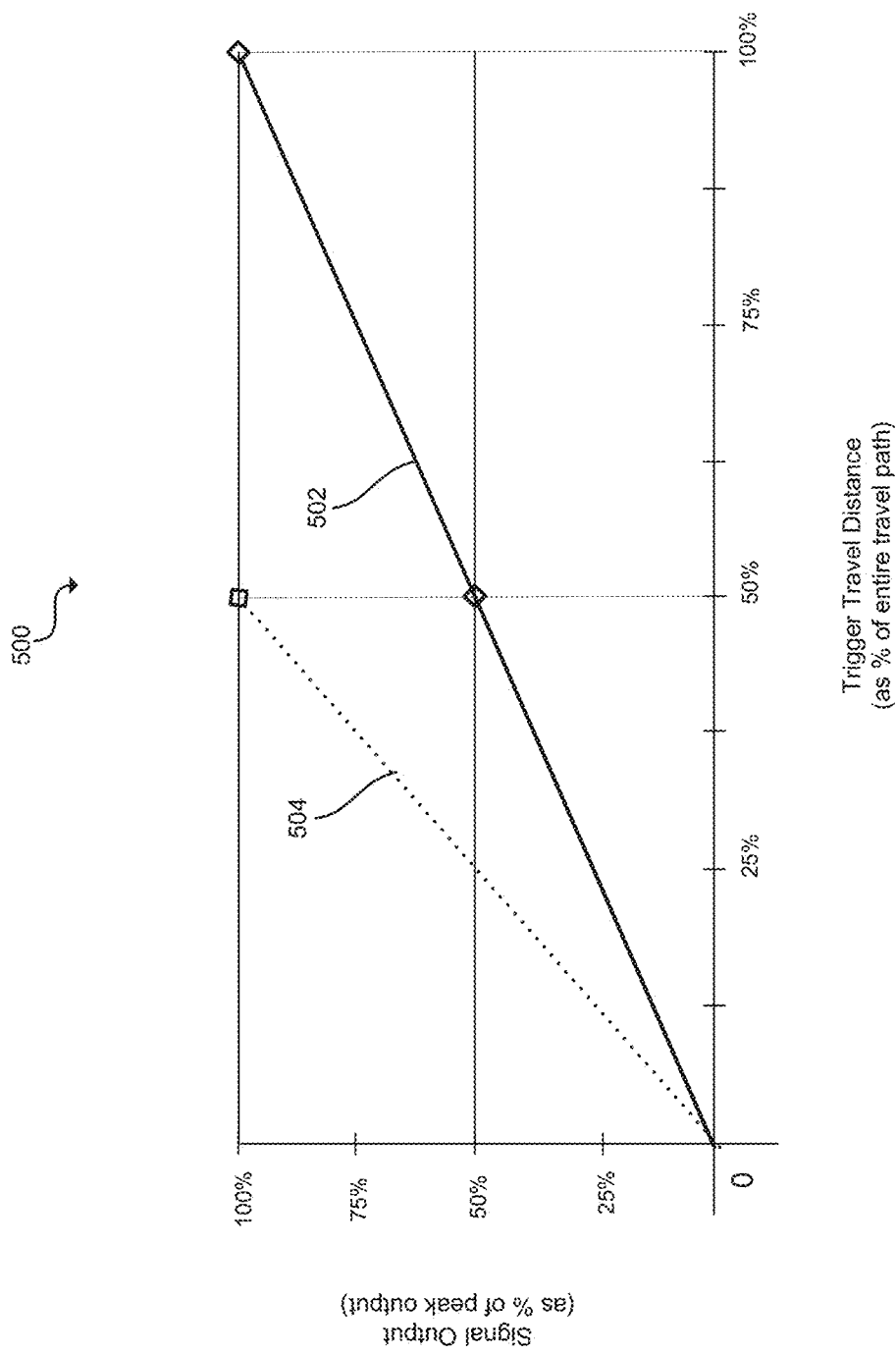
FIG. 5A depicts an example first mapping profile (mapping relationship) and second mapping profile (mapping relationship) that may be implemented in accordance with one or more embodiments of the present disclosure.

FIG. 5A is a graphical depiction of exemplary signal output profiles (i.e., signal mapping schemes) that may be implemented in accordance with one or more embodiments of the present disclosure. Assuming a linear mapping profile, which may be implemented in accordance with some embodiments, line 502 represents the signal output profile under normal operating conditions (i.e., when trigger-stop is not engaged). As the trigger is gradually pulled from its resting position (e.g., 0% displacement along the travel path) to its fully pulled position (e.g., 100% displacement along the travel path), the signal communicated to the console may gradually increase in strength (e.g., voltage), as shown, from 0% signal strength (i.e., no signal) to 100% signal strength (i.e., maximum output strength, e.g., 1 mv). The relationship between the relative degree of trigger pull and the signal output to the controller may be linear (as shown), or follow any other relationship or pattern (e.g., nonlinear, exponential, power, etc.).

As a smart trigger-stop in accordance with the present disclosure is engaged by a user, the trigger travel path is reduced and the signal mapping scheme is adjusted (i.e., a different mode is implemented). For example, as shown in FIG. 5A, dotted line 504 represents the signal output profile when a trigger-stop mode is implemented, e.g., when the trigger stop 120 of the present disclosure is moved to block the normal trigger travel path such that the trigger is stopped at the half-way point along the travel path (i.e., 50% displacement along the travel path). In some embodiments, the movement of the trigger-stop 120 may flip a switch in the controller that signals to the processor to apply an adjusted signal mapping scheme. As depicted, the adjusted signal mapping scheme (represented by dotted line 504) may effectively double the slope of the signal output in the mapping relationship. That is, the signal strength for a given degree of trigger pull may have twice the magnitude when the trigger-stop is engaged than when it is not. Thus, as shown in the example profile depicted in FIG. 5A, even though with the trigger-stop engaged the trigger may only be pulled back to half the original distance, the signal generated or affected (and/or sequentially provided to the console) exhibits 100% signal strength just as if the trigger had been pulled back the entire distance under the normal mode.

Accordingly, not only may a smart trigger-stop of the present disclosure provide a way to shorten the trigger travel distance that must be effectuated before the trigger is stopped (and/or the user receives haptic feedback indicating the trigger has been pulled back as far as possible), but the trigger stop may further cause a signal mapping scheme to be implemented such that when the associated trigger is pulled, the output signal provided to the gaming console (either directly or as an through a sequence filters, amplifiers, relays, processing steps, etc.) Sufficiently activates the gaming functionality of interest despite the actual trigger position being different from the position that would have otherwise been required to generate a signal of equal strength (or other attribute) under normal operating mode (i.e., when the trigger stop is not engaged). For example, when the trigger-stop is engaged the trigger may only be pulled half-way (or some other distance shorter than the full distance), the gaming console may receive a signal (generated by the controller or a component thereof) that indicates that the trigger has been pulled much farther along the travel path than it actually has. Accordingly, the smart trigger-stop technology of the present disclosure may quicken response times by reducing trigger travel distances without loss of gaming functionality.

Figure 5B:
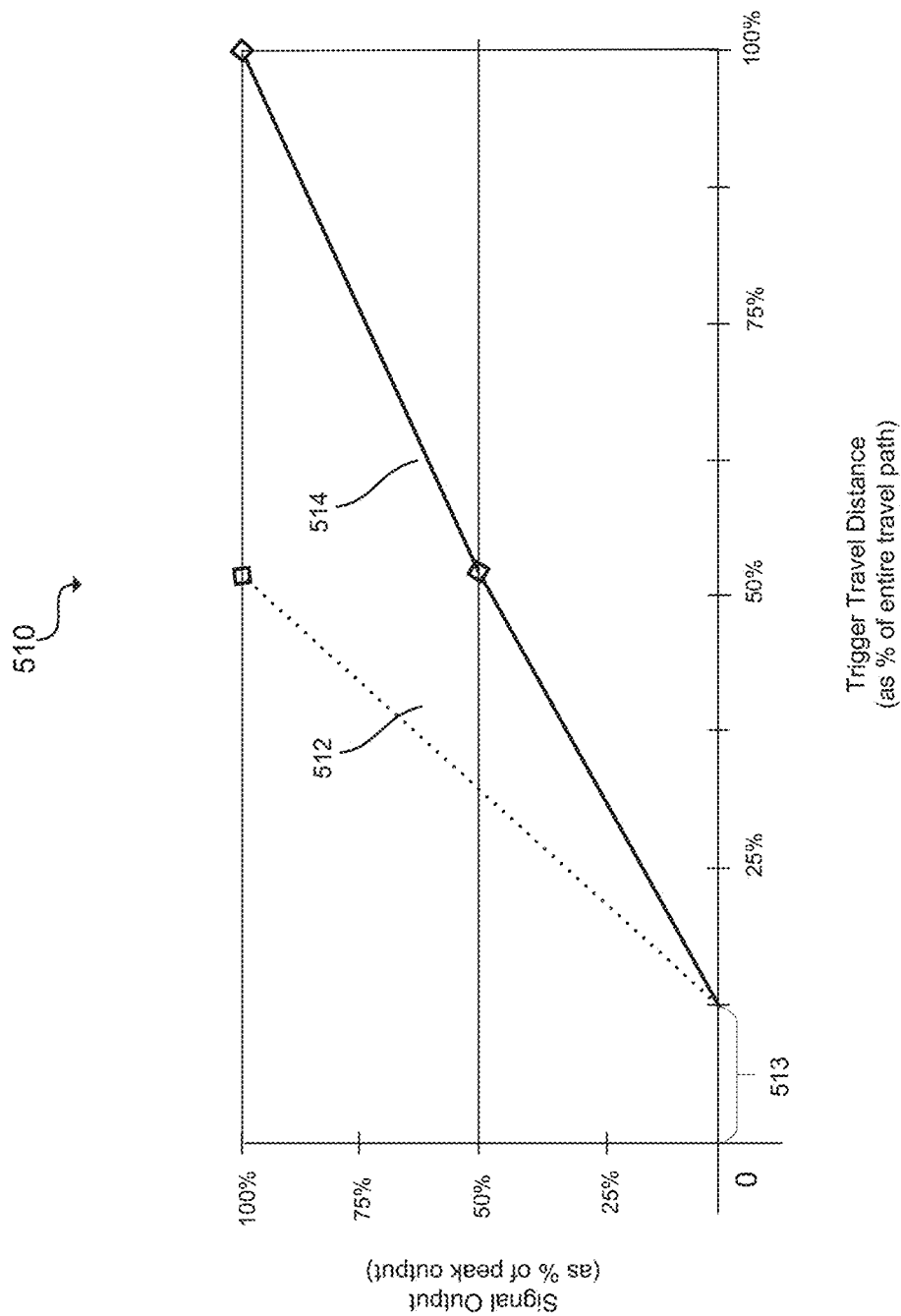
FIG. 5B depicts an example first mapping profile (first mapping relationship) and second mapping profile (second mapping relationship), here depicting a buffer zone that may be implemented in accordance with one or more embodiments of the present disclosure.

FIG. 5B is another graphical depiction of exemplary signal output profiles (i.e., signal mapping schemes) that may be implemented in accordance with one or more embodiments of the present disclosure. The signal output profiles of FIG. 5B are similar to those depicted in FIG. 5A, but with a small buffer zone 513 where no signal is produced. That is, if the trigger is moved by an amount that falls within the buffer zone (up to 12.5% movement along the travel path in this example), no signal will be produced. This feature allows a user to rest their fingers on the trigger surface (thereby causing the trigger to become slightly depressed) without unintentionally activating gaming functions.

Figure 5C:
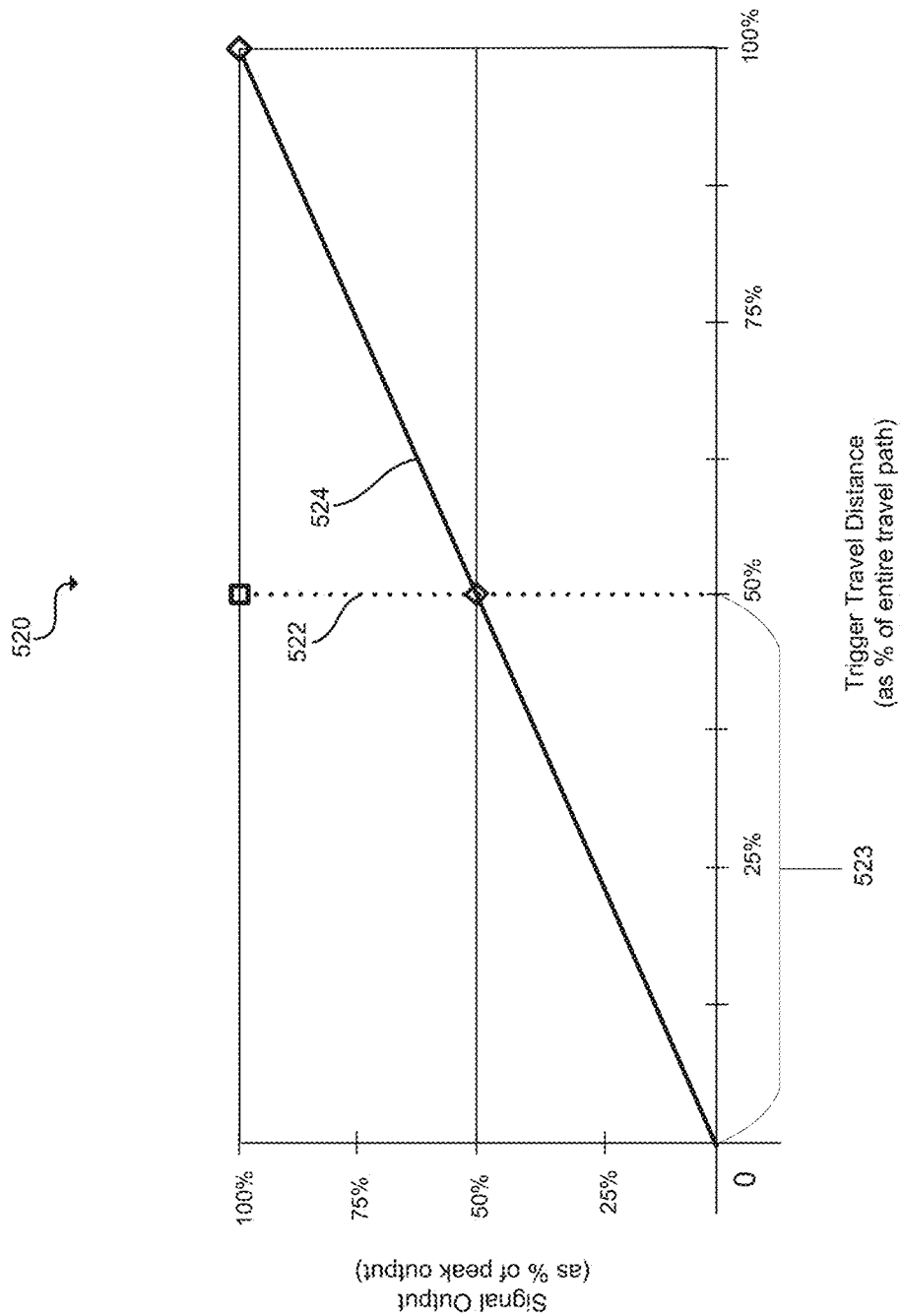
FIG. 5C depicts an example first mapping profile (mapping relationship) and second mapping profile (mapping relationship) that may be implemented in accordance with one or more embodiments of the present disclosure.

FIG. 5C is another graphical depiction of exemplary signal output profiles (i.e., signal mapping schemes) that may be implemented in accordance with one or more embodiments of the present disclosure. Line 524 represents the signal output profile applied when a trigger-stop is not engaged, while dotted line 522 represents the signal output profile when a trigger-stop of the present disclosure is engaged such that the trigger is stopped at or shortly after the half-way point along the travel path (i.e., 50% displacement along the travel path). As depicted, line 524 may define a linear and gradual relationship between the degree of trigger pull and the strength of signal output. Also as depicted by dotted line 522, in some embodiments the signal output generated or affected when the trigger-stop is in the engaged position may follow a step-function type relationship—an "on" or "off" type profile that is effectuated at a certain point along the trigger's path of travel (e.g., at the point of impact with the trigger-stop, or slightly before, here at 50% of the travel distance). This hybrid arrangement may be implemented in one or more embodiments to allow the trigger to function like a button during combat type games (with the trigger-stop being engaged), and then switch back to the gradient styled signaling profile when playing games that call for such a gradient (e.g., racing games). Although the point at which the step-function type signal is activated is depicted as being at 50% of the travel path in the example shown in FIG. 5C, it will be appreciated that the step-up point may be set at any point along the travel distance (any desired percentage of max distance), and in some embodiments may be adjustable by a user (e.g., via adjusting a multi-staged trigger stop that has more than two positions).

It should be understood that the graphical representations of signaling output profiles in FIGS. 5A-5C are only examples, and that any modifications or variations of the same may be implemented in accordance with one or more embodiments of the present disclosure. For instance, the signal output profile for the trigger-stop mode (dotted line 504) is shown to peak at a point when the trigger has been pulled to 50% of the entire travel distance. In other embodiments, the signal may peak at a point when the trigger has been pulled to more or less than 50% of the entire travel path. Similar such variations and changes may also be considered with reference to FIGS. 5B-5C. It should also be noted that although signal output is often discussed herein with reference to signal strength, any signal parameter or characteristic (e.g., frequency/wavelength, amplitude, etc.) Useful for communicating and/or carrying information may be utilized in embodiments of the present technology, and any such parameter may be scaled and/or adjusted to compensate for reduced trigger travel caused by engaged trigger-stops.

Figure 6:
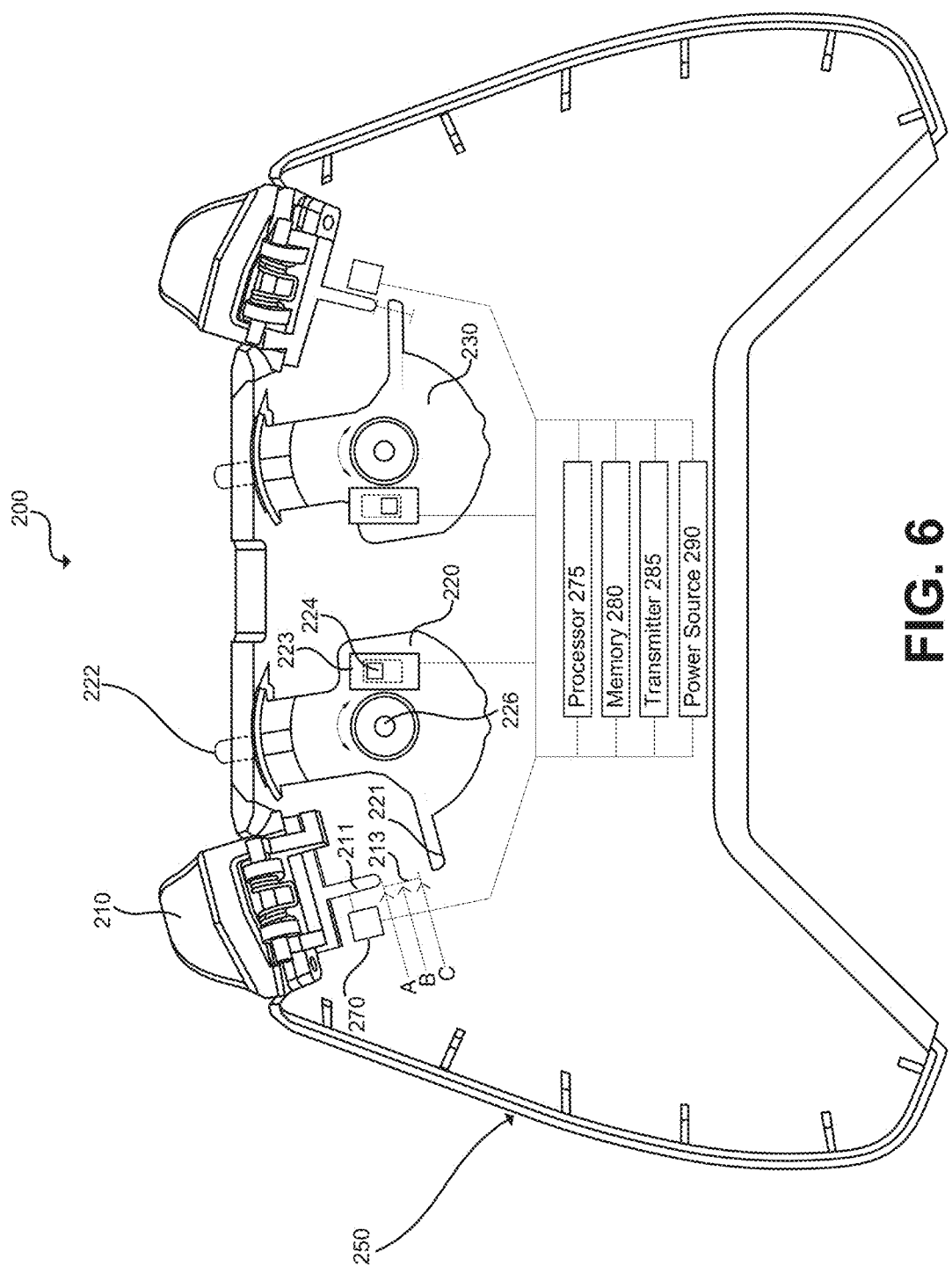
FIG. 6 illustrates a top perspective view of another example videogame controller, here depicted with a top portion of the housing removed so as to expose various internal components relating to the smart trigger-stop technology as implemented in accordance with one or more embodiments of the present disclosure.

FIG. 6 illustrates a top perspective view of another example videogame controller employing smart trigger-stop technology in accordance with one or more embodiments of the present disclosure. The embodiment depicted in FIG. 6 employs an axle 226 and a lever instead of the track 126 and slider 122 used in the embodiments depicted in FIGS. 2-4D to move the trigger-stop component into and out of an engaged position. As noted previously, any mechanism for effectuating the technology disclosed herein may be utilized, and the scope of the present disclosure should not be construed as being limited to the embodiments illustrated in the Figures, nor to the specific example mechanisms described herein for carrying out the technology. One of ordinary skill in the art will appreciate that many variations and modifications to the embodiments discussed herein may be made and implemented without exceeding the scope of the present disclosure.

With reference to the embodiment depicted FIG. 6, as shown, an exemplary gaming controller 200 in accordance with one or more implementations of the present disclosure may include one or more triggers 210, trigger-stops 220, switches 223 (or other actuators or sensors), sensors 270, processors 275, memory 280, transmitters 285, and/or power sources 290. Any one or more of the foregoing may be mechanically and/or electrically coupled with one another and/or with housing 250 of gaming controller 200, and may operate alone or together (as described herein) to facilitate one or more implementations of the smart trigger-stop technology disclosed herein. For simplicity, various electrical components in the exemplary embodiment illustrated are depicted symbolically using boxes (e.g., sensor 270, processor 275, etc.).

As shown, trigger-stop 220 may be movably coupled with housing 250 such that a user may move trigger-stop 220 from a disengaged position into an engaged position (i.e., from a first position into a second position) and vice versa by moving the actuator (lever component 222) from side-to-side.

Similar to the embodiments discussed above with reference to FIGS. 2-4C, moving trigger-stop 220 from a disengaged position to an engaged position (e.g., moving the lever 222 such that trigger-stop 220 rotates about axle 226) may: (i) cause a portion of trigger-stop 220 to move into a portion of trigger 210's travel path (the travel path indicated symbolically by the broken line referenced as numeral 213) and thereby block or otherwise reduce the degree to which trigger 210 may be pulled/depressed, and (ii) cause a switch 223 coupled to trigger-stop 220 to be flipped and thereby signal to processor 275 that the trigger-stop 220 is in an engaged position and that signal transmissions responsive to trigger movements should be adjusted accordingly (i.e., the signals should be processed in accordance with a different signal mapping scheme (e.g., signal scheme described by dotted line 504 of FIG. 5A).

In the depicted embodiment, trigger 210 includes arm extension 211 which may move along travel path 213 as the surface of trigger 210 is pressed by a user. When the trigger-stop 220 is in a disengaged position, trigger 210 may move along the entire travel path freely. That is, trigger arm extension 211 may move freely from Position A (the resting position) to Position C (the fully pulled position) without being stopped or blocked along the way. On the other hand, when the trigger-stop 220 is moved into the engaged position, a blocking portion 221 of trigger-stop 220 may fall within a portion of trigger 210's travel path 213 such that the trigger 210 is stopped before reaching the fully pulled position (Position C). That is, trigger arm extension 211 may be stopped or blocked at Position B as the trigger moves along the travel path 213, thereby reducing the total distance the trigger may travel before being stopped. As such, user may be able to receive tactile feedback at their fingertip (indicating the trigger has been sufficiently pressed) more quickly than when the trigger-stop is not engaged. In particular, the user may feel the impact between the blocking portion 221 of the trigger-stop 220 and the arm extension 211 of trigger 210 more quickly than they might feel the impact of the arm extension 111 with some other native feature of the controller at the end of the travel path 113 (at Position C). Because the travel path of trigger 210 may be reduced by engaging trigger-stop 220, a user may operate the trigger controls of controller 200 in less time and with greater efficiency.

The remaining features of the embodiment depicted in FIG. 6 have been adequately described with reference to prior Figures (with similar numerals representing similar features).

Figure 7:
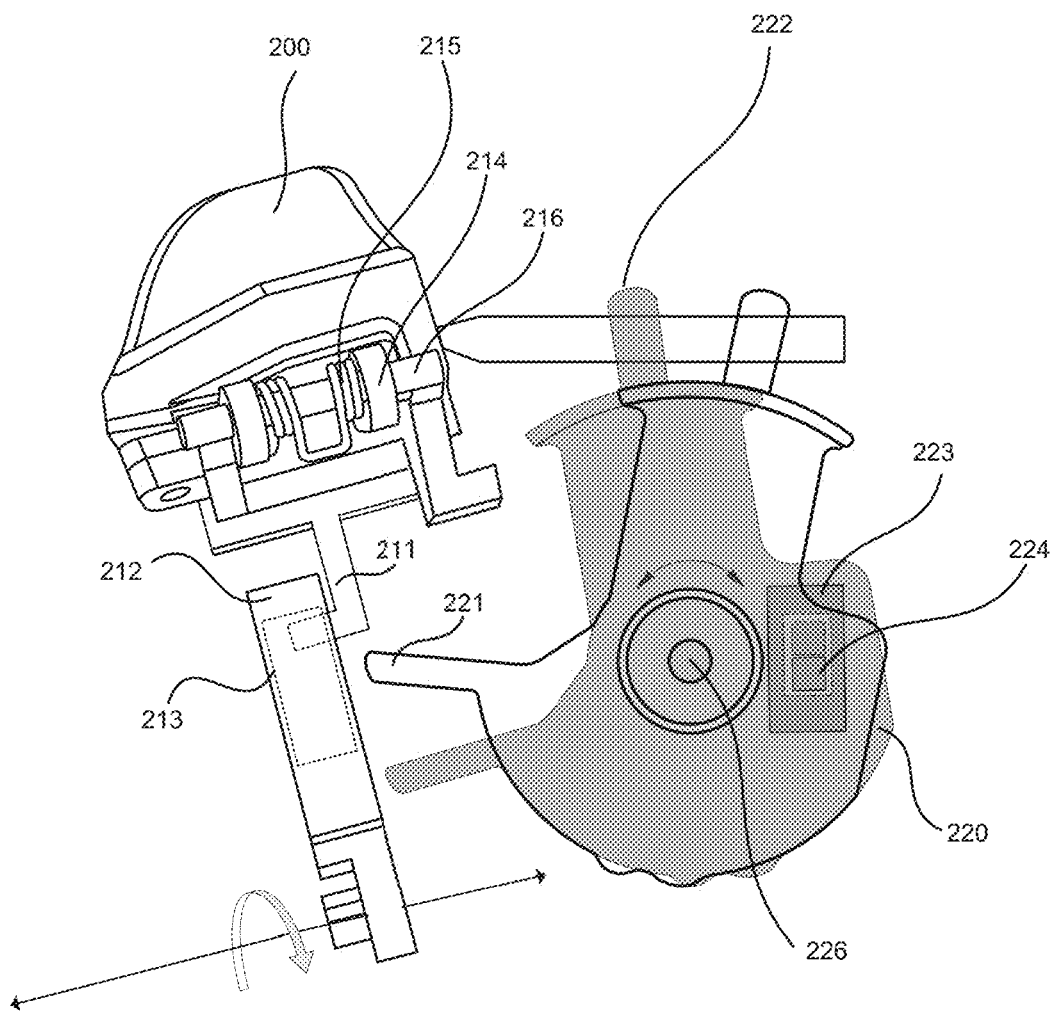
FIG. 7 illustrates a magnified view of various internal components shown in FIG. 6 and relating to the smart trigger-stop technology as implemented in accordance with one or more embodiments of the present disclosure.

FIG. 7 illustrates a magnified view of exemplary trigger and trigger-stop componentry, here depicting trigger-stop 220 in both an engaged position (unshaded) and a disengaged position (shaded), in accordance with one or more embodiments of the present disclosure. As may be observed, moving trigger-stop 220 from the disengaged position (shaded) to the engaged position (unshaded) causes the blocking portion 221 of trigger-stop 220 to move into trigger 200's travel path. The travel path 213 may be defined in part by an aperture of a guide element 212 within which an elbow knob/extension of arm extension 211 may be situated. In the engaged position, trigger-stop 220 will stop trigger 210 along the travel path before it reaches the fully-pulled position (Position C). Additionally, moving trigger-stop 220 from the disengaged position into the engaged position may cause switch 223 (which may be mechanically or electrically coupled with trigger-stop 220) to be flipped/switched. Flipping the switch into a different state/mode/condition may signal to processor 275 that the trigger-stop 220 is in the engaged position and that the controller 200's signal transmissions responsive to trigger movement(s) should be adjusted accordingly (i.e., the signals should be processed in accordance with a modified signal mapping scheme).

Figure 8A:
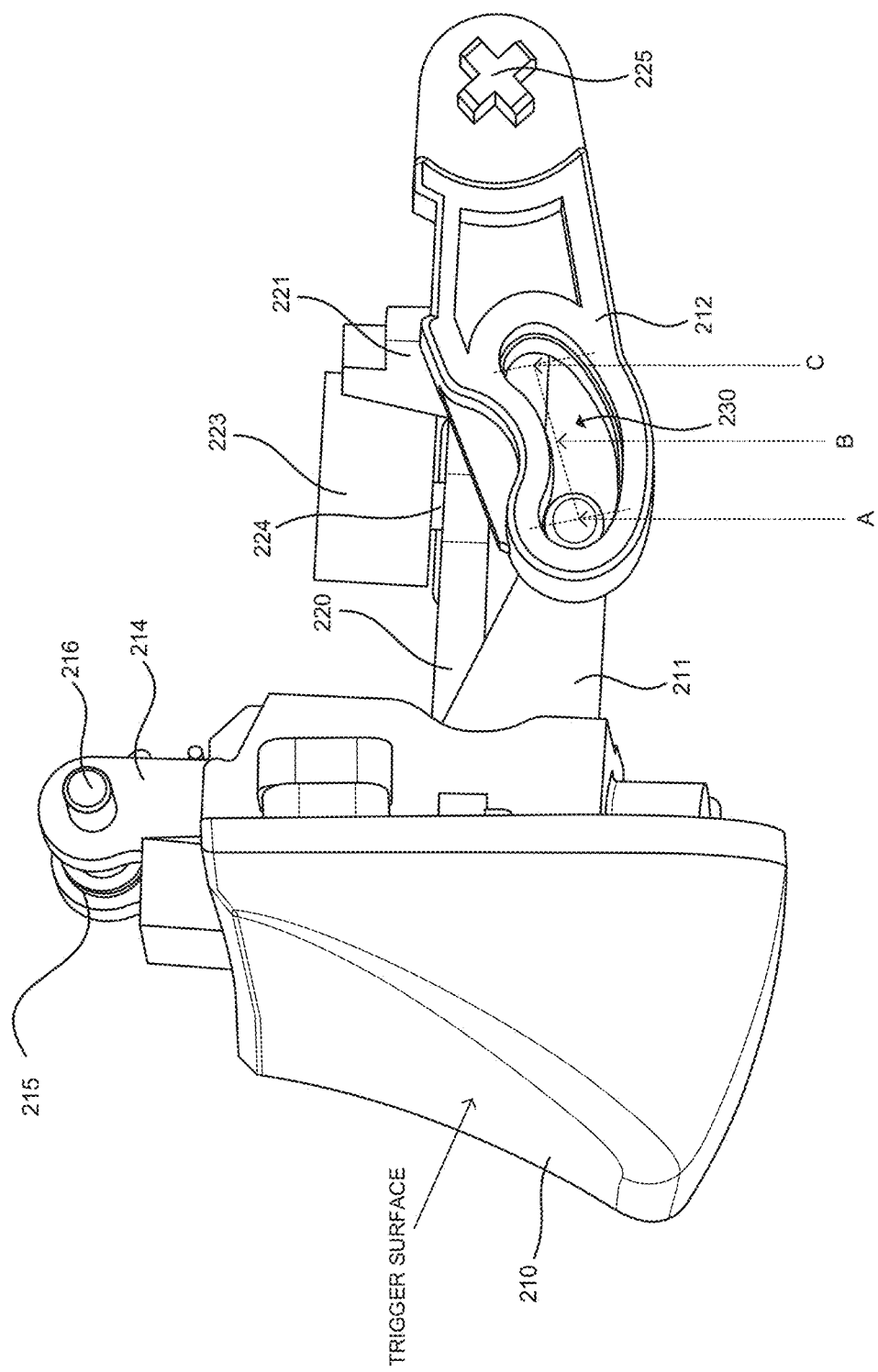
FIG. 8A illustrates a magnified perspective side view of an example trigger and trigger-stop assembly in accordance with one or more embodiments of the present disclosure.
Figure 8B:
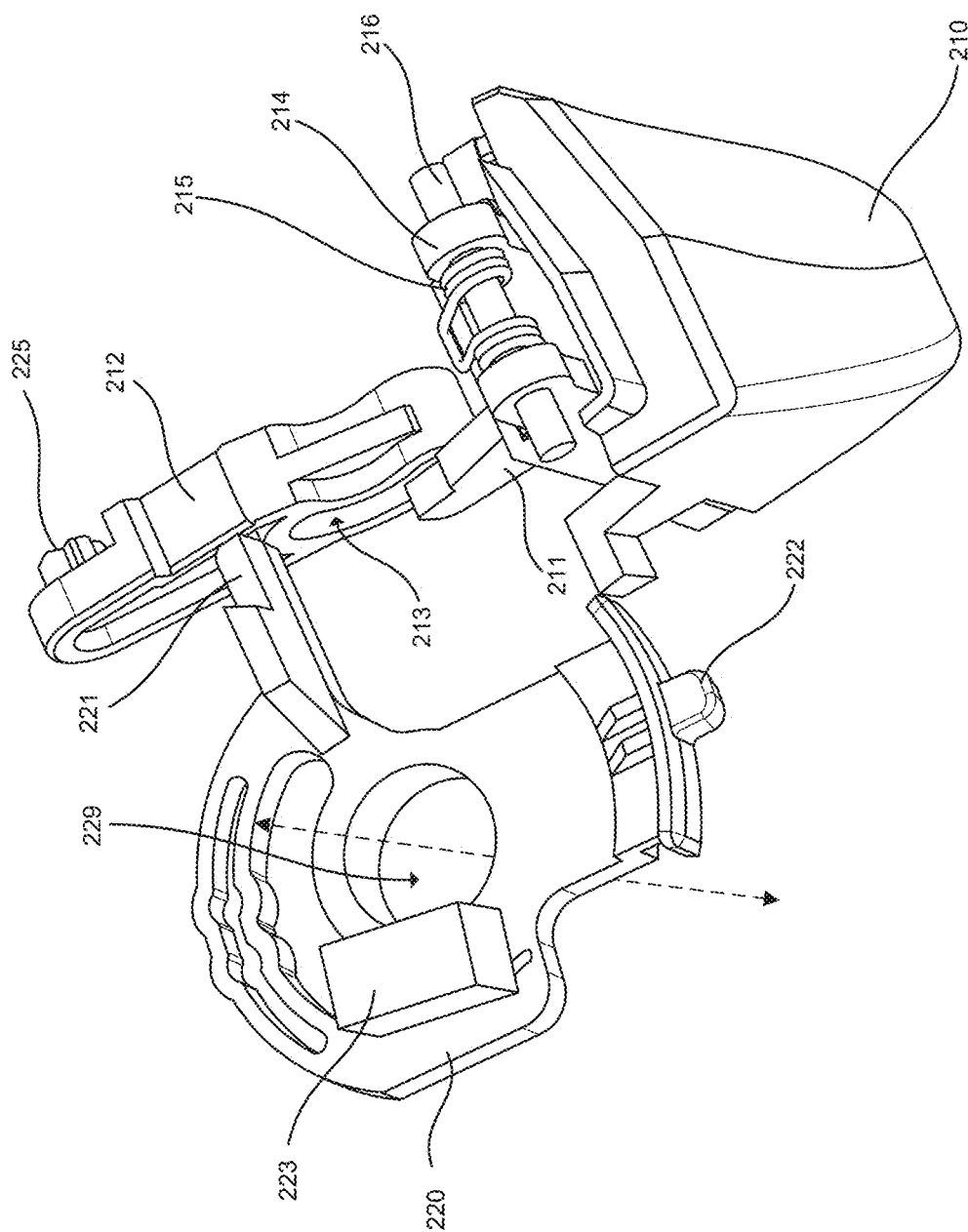
FIG. 8B illustrates a magnified perspective aerial view of the example trigger and trigger-stop assembly depicted in FIG. 8A, in accordance with one or more embodiments of the present disclosure.

FIG. 8A-8C illustrate various perspective views of the example trigger and trigger-stop componentry shown in FIG. 6 in accordance with one or more embodiments of the present disclosure.

FIG. 8A illustrates a magnified perspective side view of the smart trigger-stop assembly shown in FIG. 6, the trigger in a released/unpressed position. As shown, a slider 224 of switch 223 may be inserted into an aperture or other feature of trigger-stop 220. The slider 224 may be positioned such that the movement (e.g., rotation) of the trigger-stop 220 structure causes the slider 224 to move between two or more positions. As may be recognized, when trigger-stop 220 is engaged, blocking portion 221 may prevent elbow knob of arm extension 211 from moving beyond a certain point (e.g., Position B) along the path from Position A (resting position) to Position C (fully pulled position).

FIGS. 8B and 8C illustrates magnified perspective views of the example trigger and trigger-stop assembly depicted in FIG. 8A, in accordance with one or more embodiments of the present disclosure. The depicted views demonstrates that trigger-stop 220 may be included or otherwise coupled to a lever component 222, lever component 222 being configured to extend through the housing 250 of videogame controller 200 to enable a user to maneuver the trigger-stop 220 relative to the trigger 210 and at least partially block its range of movement (e.g., causing trigger-stop 220 to rotate about axel 226 until blocking portion 221 is in the arm extension 211's path of travel).

It is reemphasized here that the drawings have been provided for illustration purposes only, and merely depict typical or example embodiments of the disclosed technology. Variations and modifications will be apparent to a person of ordinary skill in the art after reviewing this disclosure, and all such variations and modifications are intended to fall within the scope of the present disclosure. For instance, FIG. 3 depicts how a blocking mechanism (e.g. 121) may be moved into and out of engaged and disengaged positions by being moved from side to side (e.g., from right to left) and FIG. 7 depicts how a blocking mechanisms (e.g., 221) may be moved into and out of engaged and disengaged positions by being rotated (e.g., clockwise or counterclockwise), but other mechanisms may also be employed—e.g., such as a blocking mechanism situated along the imaginary line in the extension arm's path of travel that can slide forward or backward along that line (deeper or less deep into the path) to adjust the throw of the trigger. In such an instance, the farther the blocking mechanism is slid into position, the shorter the distance before the trigger (or extension arm) hits the stop (of which the blocking mechanism may be a part).

In another example modification or variation, the smart trigger stop technology of the present disclosure may be adapted to include an adjustable trigger stop with more than one engaged position (i.e., a multimodal trigger-stop assembly). For instance, referring to FIG. 7, the smart trigger-stop assembly may include allow for lever 222 to be moved by degrees (e.g., a little or a lot, or anywhere in between) to correspondingly move blocking mechanism 221 by degrees and thereby change the position at which the trigger is blocked so that the user can select a very short throw, a medium throw, etc. Instead of being limited to either a fully engaged or fully disengaged options (e.g., blocked or unblocked in a "binary" fashion). In such an embodiment, as well as others, switch 223 may be a variable switch instead of an on/off switch. Such a variable switch may change the signal level, current, duty cycle or other signal parameter that is sent to the processor such that the processor may determine at what point along the path the stop is positioned. The processor and/or controller may further be configured to incrementally change the signal output profile (i.e., the mapping scheme or mapping profile) as the signal parameter received from the variable switch incrementally changes in response to movements of the blocking mechanism (which may situate of the blocking mechanism in one of a plurality of different positions). That is, although much of this disclosure describes embodiments implemented to provide dual-mode (i.e., two-stage) trigger-stop functionality (as depicted in FIG. 3), in other embodiments the trigger-stop technology may be implemented to provide a multi-mode (i.e., multi-stage) stopping functionality.

Furthermore, and though not depicted in detail in the foregoing Figures, the smart trigger stop technology of the present disclosure may also include a trigger rebound component coupled to one or both of the trigger (or a subcomponent or extension of the trigger) and the trigger stop (or a subcomponent or extension of the trigger stop), the trigger rebound component may be any material or mechanism configured to provide forward thrust to the trigger upon being pulled back to a stopping point. For example, an elastomeric material may be coupled to the leading edge of the blocking portion of a trigger-stop, the elastomeric material providing a degree of bounce-back to the trigger so as to decrease the amount of time it takes the trigger to return to the released/relaxed position. In other examples a spring, coil, plunger, solenoid or any other component of mechanism may be deployed to achieve added bounce in the trigger rebound.

Figure 9:
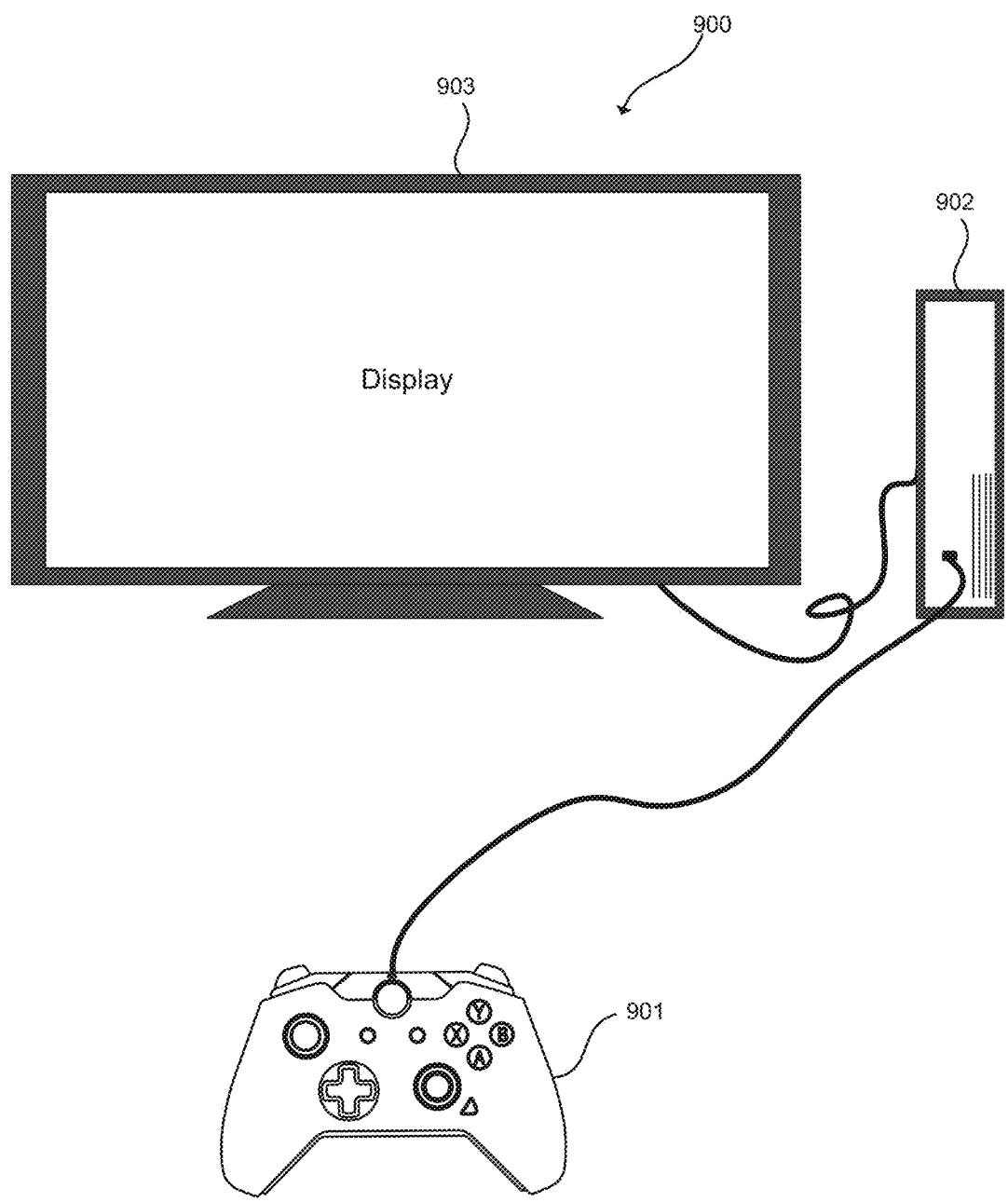
FIG. 9 illustrates an example system within which a videogame controller including smart trigger-stops may be implemented in accordance with one or more embodiments of the present disclosure.
Figure 10:
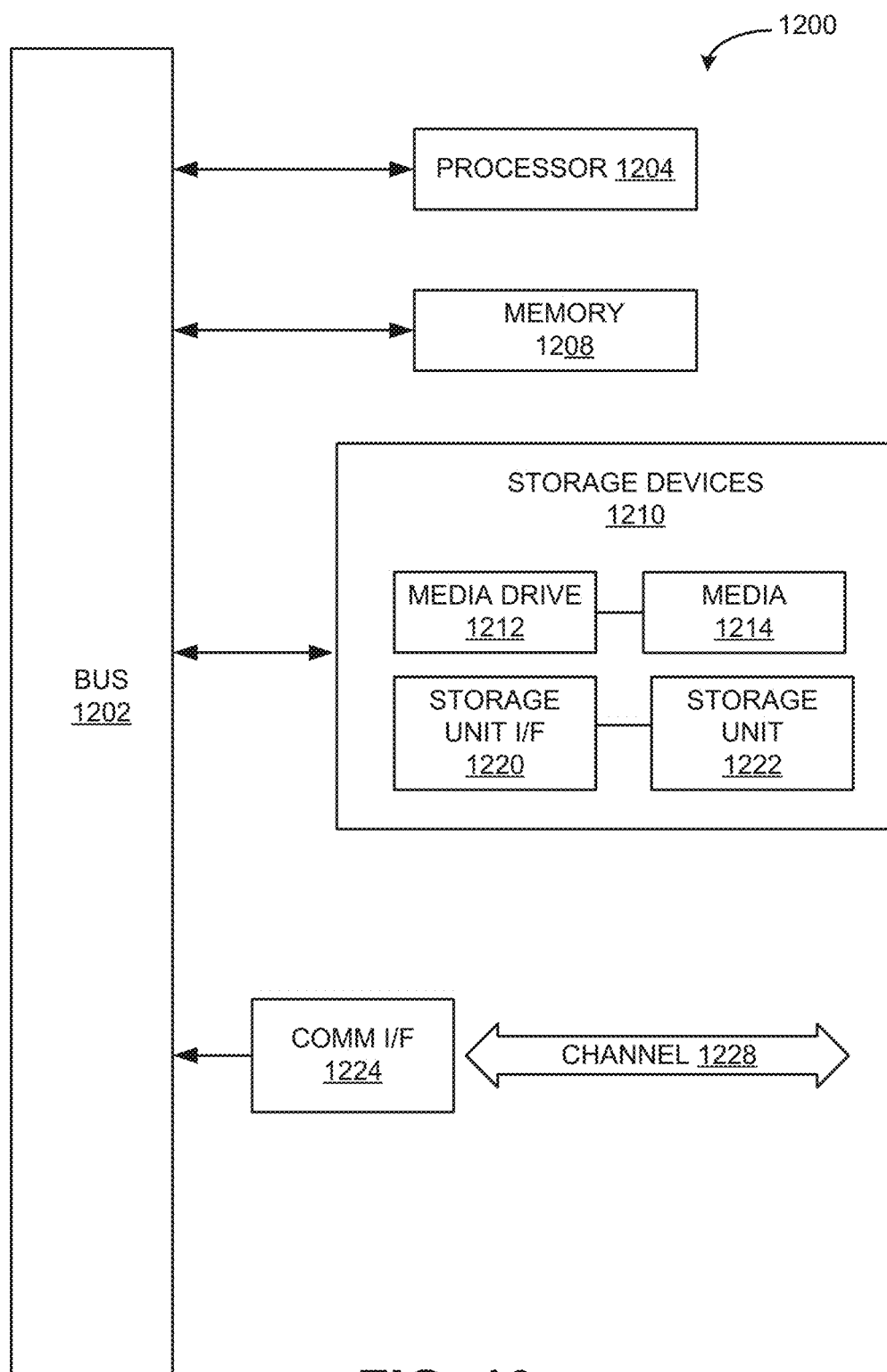
FIG. 10 illustrates an example computing module that may be used to implement various features of the systems and methods for transmitting data between a remote device and a computing device as disclosed herein.

FIG. 9 depicts a system within which one or more embodiments of the present disclosure may be implemented. As shown, system 900 may include a display 901, a videogame console 902, and a videogame controller 903 including one or more smart trigger stops as disclosed herein. Any one or more of videogame controller 903, the videogame console 902, and the display 901 may be communicatively, electrically, and/or mechanically coupled with one another to facilitate a gaming experience for a user. The electrical circuitry included in controller 903 may generate a signal responsive to trigger movements and convey that signal to console 902. Console 902 may process the signal and effectuate a gaming function or operation the signal is mapped to, and generate appropriate signal to modify the video experience viewed on the display 901 based, in whole or in part, on the signal received from the controller. The components of system 900 are depicted as being communicatively coupled through one or more wires (e.g., wire 904, 905). However, it should be noted that wireless communication protocols may also be employed as desired in the various embodiments of the present disclosure. Moreover, although not depicted in this manner, in some embodiments of the present disclosure the display 903, the console 902, and the controller 901 may all be comprised in a single device (e.g., a handheld Nintendo 3Ds). Further, any one or more of the foregoing may include or be otherwise deployed with computing modules and/or technology that enables any one or more of the features and/or technologies disclosed herein. FIG. 10 discusses such modules in greater detail Referring now to FIG. 10, computing module 1200 may represent, for example, computing or processing capabilities found within desktop, laptop, notebook, gaming consoles, and tablet computers; hand-held computing devices (tablets, PDA's, smart phones, cell phones, palmtops, etc.); wearable computing devices such as smartwatches; mainframes, supercomputers, workstations or servers; or any other type of special-purpose or general-purpose computing devices as may be desirable or appropriate for a given application or environment. Computing module 1200 might also represent computing capabilities embedded within or otherwise available to a given device. For instance, a computing module might be found in other electronic devices such as, for example, digital cameras, videogame consoles, gaming controllers, navigation systems, cellular telephones, videogame controllers portable computing devices, modems, routers, WAPs, terminals and other electronic devices that might include some form of processing capability.

Computing module 1200 might include, for example, one or more processors (e.g., such as processor 175, processor 275, etc.), controllers, control modules, or other processing devices, such as a processor 1204. Processor 1204 might be implemented using a general-purpose or special-purpose processing engine such as, for example, a microprocessor, controller, or other control logic. In the illustrated example, processor 1204 is connected to a bus 1202, although any communication medium can be used to facilitate interaction with other components of computing module 1200 or to communicate externally.

Computing module 1200 might also include one or more memory modules, simply referred to herein as main memory 1208. For example, preferably random access memory (RAM) or other dynamic memory, might be used for storing information and instructions to be executed by processor 1204. Main memory 1208 might also be used for storing temporary variables or other intermediate information during execution of instructions to be executed by processor 1204. Computing module 1200 might likewise include a read only memory ("ROM") or other static storage device coupled to bus 1202 for storing static information and instructions for processor 1204.

The computing module 1200 might also include one or more various forms of information storage mechanism 1210, which might include, for example, a media drive 1212 and a storage unit interface 1220. The media drive 1212 might include a drive or other mechanism to support fixed or removable storage media 1214. For example, a hard disk drive, a solid state drive, a magnetic tape drive, an optical disk drive, a CD, DVD, or Blu-ray drive (R or RW), or other removable or fixed media drive might be provided. Accordingly, storage media 1214 might include, for example, a hard disk, a solid state drive, magnetic tape, cartridge, optical disk, a CD, DVD, Blu-ray or other fixed or removable medium that is read by, written to or accessed by media drive 1212. As these examples illustrate, the storage media 1214 can include a computer usable storage medium having stored therein computer software or data.

In alternative embodiments, information storage mechanism 1210 might include other similar instrumentalities for allowing computer programs or other instructions or data to be loaded into computing module 1200. Such instrumentalities might include, for example, a fixed or removable storage unit 1222 and an interface 1220. Examples of such storage units 1222 and interfaces 1220 can include a program cartridge and cartridge interface, a removable memory (for example, a flash memory or other removable memory module) and memory slot, a PCMCIA slot and card, and other fixed or removable storage units 1222 and interfaces 1220 that allow software and data to be transferred from the storage unit 1222 to computing module 1200.

Computing module 1200 might also include a communications interface 1224. Communications interface 1224 might be used to allow software and data to be transferred between computing module 1200 and external devices. Examples of communications interface 1224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1224 might typically be carried on signals, which can be electronic, electromagnetic (which includes optical) or other signals capable of being exchanged by a given communications interface 1224. These signals might be provided to communications interface 1224 via a channel 1228. This channel 1228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1208, storage unit 1220, media 1214, and channel 1228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1200 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A video game controller, comprising:
   a housing;
   a trigger movably coupled to the housing via a spring-loaded hinge, the trigger pivotable about a first axis along a travel path in a direction transverse to the axis from a default position to a fully depressed position;
   a processor configured to communicate output signals to a gaming console based at least in part on movement of the trigger;
   a trigger stop movably coupled to the housing, the trigger stop linearly movable between a first position that allows the trigger to be depressed along the travel path to a fully depressed position and a second position that limits the trigger to move along a reduced travel distance between the default position and an intermediate depressed position located along the travel path between the default position and the fully depressed position, and
   an electrical switch configured to communicate with the processor, the electrical switch configured to operate in a first mode when the trigger stop is in the first position and configured to operate in a second mode different than the first mode when the trigger stop is in the second position,
   wherein the processor is configured to map movement of the trigger to said output signals in accordance with a first mapping profile when the switch is in the first mode and configured to map movement of the trigger to said output signals in accordance with a second mapping profile different than the first mapping profile when the switch is in the second mode, wherein the output signal communicated by the processor when the switch is in the first mode and the trigger is fully depressed is the same as the output signal communicated by the processor when the switch is in the second mode and the trigger is depressed to the intermediate depressed position.

2. The video game controller of claim 1, wherein the trigger stop in the second position is configured to contact at least a portion of the trigger to limit movement of the trigger along the travel path.

3. The video game controller of claim 1, wherein the trigger-stop includes a lever that extends through an opening in the housing, the lever configured to be engaged by a user to move the trigger-stop between the first position and the second position.

4. The video game controller of claim 1, further comprising a sensor configured to detect a position of the trigger along the travel path and configured to generate a signal representative of a trigger position, the sensor configured to communicate with the processor.

5. A video game controller, comprising:
   a housing;
   a trigger movably coupled to the housing, the trigger pivotable about a first axis along a travel path in a direction transverse to the axis from a default position to a fully depressed position;
   a processor configured to communicate output signals to a gaming console based at least in part on movement of the trigger;
   a trigger stop movably coupled to the housing, the trigger stop movable between a first position that allows the trigger to be depressed along the travel path to a fully depressed position and a second position that limits the trigger to move along a reduced travel distance between the default position and an intermediate depressed position located along the travel path between the default position and the fully depressed position, and
   an electrical switch configured to communicate with the processor, the electrical switch configured to operate in a first mode when the trigger stop is in the first position and configured to operate in a second mode different than the first mode when the trigger stop is in the second position,
   wherein the processor is configured to map movement of the trigger to said output signals in accordance with a first mapping profile when the switch is in the first mode and configured to map movement of the trigger to said output signals in accordance with a second mapping profile different than the first mapping profile when the switch is in the second mode, wherein the output signal communicated by the processor when the switch is in the first mode and the trigger is fully depressed is the same as the output signal communicated by the processor when the switch is in the second mode and the trigger is depressed to the intermediate depressed position.

6. The video game controller of claim 5, wherein the trigger stop in the second position is configured to contact at least a portion of the trigger to limit movement of the trigger along the travel path.

7. The video game controller of claim 5, wherein the trigger stop is movable linearly in a direction generally transverse to the travel path of the trigger.

8. The video game controller of claim 5, wherein the trigger stop is rotatable between the first position and a second position about a second axis different than the first axis.

9. The video game controller of claim 5, wherein the trigger-stop includes a lever that extends through an opening in the housing, the lever configured to be engaged by a user to move the trigger-stop between the first position and the second position.

10. The video game controller of claim 5, further comprising a sensor configured to detect a position of the trigger along the travel path and configured to generate a signal representative of a trigger position, the sensor configured to communicate with the processor.

11. The video game controller of claim 5, wherein movement of the trigger stop between the first position and the second position simultaneously actuates the electrical switch between the first mode and second mode.

* * * * *

UNITED STATES PATENT AND TRADEMARK OFFICE
CERTIFICATE OF CORRECTION

PATENT NO. : 10,632,367 B2  
APPLICATION NO. : 16/175735  
DATED : April 28, 2020  
INVENTOR(S) : Strahle et al.

Page 1 of 1

It is certified that error appears in the above-identified patent and that said Letters Patent is hereby corrected as shown below:

In the Specification

In Column 2, Line 63, delete "my" and insert -- mV --.

In Column 14, Line 4, delete "FIG." and insert -- FIGS. --.

In Column 14, Line 29, delete "Figure A," and insert -- FIG. 4A, --.

In Column 15, Line 33, after "as" delete "an".

In Column 18, Line 21, delete "FIG." and insert -- FIGS. --.

In Column 20, Line 12, after "detail" insert -- . --.

Signed and Sealed this  
Fourth Day of August, 2020

Andrei Iancu  
*Director of the United States Patent and Trademark Office*